(12) United States Patent
Kim et al.

(10) Patent No.: US 7,995,512 B2
(45) Date of Patent: Aug. 9, 2011

(54) METHOD OF TRANSMITTING DATA IN CELLULAR NETWORKS USING COOPERATIVE RELAYING

(75) Inventors: Sang Gook Kim, San Diego, CA (US); Young C. Yoon, San Diego, CA (US); Li-Hsiang Sun, San Diego, CA (US); Shu Wang, San Diego, CA (US)

(73) Assignee: LG Electronics Inc., Seoul (KR)

( * ) Notice: Subject to any disclaimer, the term of this patent is extended or adjusted under 35 U.S.C. 154(b) by 668 days.

(21) Appl. No.: 11/536,549

(22) Filed: Sep. 28, 2006

(65) Prior Publication Data

US 2007/0070954 A1    Mar. 29, 2007

Related U.S. Application Data

(60) Provisional application No. 60/722,006, filed on Sep. 28, 2005.

(51) Int. Cl.
*H04B 7/14* (2006.01)
*H04B 3/36* (2006.01)
*H04B 1/60* (2006.01)
*H04B 17/02* (2006.01)
*H04B 7/00* (2006.01)
*H04B 15/00* (2006.01)

(52) U.S. Cl. ............. 370/315; 455/7; 455/10; 455/15; 455/16; 455/17; 455/503

(58) Field of Classification Search .......... 370/315, 370/336; 455/433, 7, 10, 15, 16, 17, 503
See application file for complete search history.

(56) References Cited

U.S. PATENT DOCUMENTS 5,930,240 A * 7/1999 Wichman ............... 370/315

(Continued)

FOREIGN PATENT DOCUMENTS

EP    1056237    11/2000

(Continued)

OTHER PUBLICATIONS

Agustin et al., "Evaluation of turbo H-ARQ schemes for cooperative MIMO transmission" in Proceedings of International Workshop on Wireless Ad-hoc Neworks (IWWAN '04), Oulu, Finland, May-Jun. 2004.*

(Continued)

*Primary Examiner* — Jinsong Hu
*Assistant Examiner* — Opiribo Georgewill
(74) *Attorney, Agent, or Firm* — Lee, Hong, Degerman, Kang & Waimey

(57) ABSTRACT

A method of transmitting data packets in a mobile communication system using at least one relay station (RS) and using at least two frequency carriers is disclosed. More specifically, the method comprises transmitting at least one subpacket of a first data packet to a mobile station (MS) on a first frequency carrier, and transmitting at least one subpacket of a second data packet to the MS via the at least one RS. Here, the at least one subpacket of second data packet from the at least one RS is transmitted on a second frequency carrier, a first subpacket of the first data packet and a first subpacket of the second data packet is transmitted via a main channel of the first frequency carrier and the main channel of the second frequency carrier, respectively, and at least one subsequent subpacket of the first data packet and at least one subsequent subpacket of the second data packet are transmitted via at least one assistant channel of the first frequency carrier and the at least one assistant channel of the second frequency carrier, respectively.

6 Claims, 20 Drawing Sheets

Main channel

Assistant channels

U.S. PATENT DOCUMENTS

| | | | |
|---|---|---|---|
| 5,943,326 A * | 8/1999 | Schroderus | 370/324 |
| 6,711,223 B2 * | 3/2004 | Kaewell et al. | 375/356 |
| 6,728,302 B1 | 4/2004 | Dabak et al. | |
| 7,123,887 B2 | 10/2006 | Kim et al. | |
| 7,340,669 B2 * | 3/2008 | Shen | 714/786 |
| 7,428,268 B2 * | 9/2008 | Shen et al. | 375/267 |
| 2002/0060996 A1 | 5/2002 | Kwak et al. | |
| 2002/0131382 A1 | 9/2002 | Kim et al. | |
| 2002/0163980 A1 * | 11/2002 | Ruohonen | 375/345 |
| 2002/0172162 A1 | 11/2002 | Goodings | |
| 2003/0073403 A1 * | 4/2003 | Miyazaki | 455/7 |
| 2003/0117025 A1 * | 6/2003 | Rouquette | 307/147 |
| 2003/0211828 A1 * | 11/2003 | Dalgleish et al. | 455/11.1 |
| 2004/0102219 A1 * | 5/2004 | Bunton et al. | 455/560 |
| 2004/0266338 A1 * | 12/2004 | Rowitch | 455/7 |
| 2005/0020295 A1 * | 1/2005 | Attar et al. | 455/522 |
| 2005/0130672 A1 * | 6/2005 | Dean et al. | 455/456.1 |
| 2006/0109810 A1 * | 5/2006 | Au et al. | 370/328 |
| 2007/0019761 A1 * | 1/2007 | Park et al. | 375/341 |
| 2008/0117896 A1 * | 5/2008 | Romero et al. | 370/389 |
| 2008/0165720 A1 * | 7/2008 | Hu et al. | 370/315 |
| 2009/0116420 A1 * | 5/2009 | Jeong et al. | 370/312 |

FOREIGN PATENT DOCUMENTS

| | | | |
|---|---|---|---|
| KR | 10-2003-0037360 | 5/2003 | |
| RU | 2154913 | 8/2000 | |
| WO | 99/17476 | 4/1999 | |
| WO | WO 02/78210 A2 * | 1/2002 | |
| WO | WO 02/078210 | 10/2002 | |
| WO | 03003672 | 1/2003 | |
| WO | 03088521 | 10/2003 | |
| WO | 2004/038958 | 5/2004 | |
| WO | 2004040799 | 5/2004 | |
| WO | WO 2004047338 A1 * | 6/2004 | |

OTHER PUBLICATIONS

Laneman et al., "Distributed Space-Time-Coded Protocols for Exploiting Cooperative Diversity in Wireless Networks", IEEE Transaction of Information Theory, vol. 49, No. 10, Oct. 2003.*

Yin et al., "Enhanced Broadcast-Multicast for HRPD", C30-20040607-060, Jun. 7, 2004.*

Laneman, J.N. et al.: "Distributed Space-Time-Coded Protocols for Exploiting Cooperative Diversity in Wireless Networks". IEEE Transactions on Information Theory, Piscataway: IEEE, Oct. 2003.

Laneman, J.N. et al: Cooperative Diversity in Wireless Networks: Efficient Protocols and Outage Behavior. IEEE Transactions on Information Theory, Piscataway: IEEE, Dec. 2004.

Chase, D.: Code Combining—A Maximum-Likelihood Decoding Approach for Combining an Arbitrary Number of Noisy Packets. IEEE Transactions on Communications, Piscataway: IEEE, May 1985.

Kramer, G. et al. "Cooperative Strategies and Capacity Theorems for Relay Networks." May 2004.

Ochiaia, H. et al. "Design and analysis of Collaborative Diversity Protocols for Wireless Sensor Networks." , Sep. 2004.

Laneman, J.N. et al. "Distributed Space-Time-Coded Protocols for Expliting Cooperative diversity in Wireless Networks." Oct. 2003.

Laneman, J.N. et al. "Cooperative Diversity in Wireless Networks: Efficient Protocols and Outage Behavior." Dec. 2004.

Chase, D. "Code Combining— A Maximum-Likelihood Decoding Approach for combining an Arbitrary Number of Noisy Packets." May 1985.

* cited by examiner

CDMA SPREADING AND DESPREADING

CDMA SPREADING AND DESPREADING USING MULTIPLE SPREADING SEQUENCES

CDMA 2000 CALL PROCESSING OVERVIEW

CDMA 2000 INITIALIZATION STATE

CDMA 2000 SYSTEM ACCESS STATE

CDMA2000 ACCESS ATTEMPT

CDMA ACCESS SUB-ATTEMPT

N=MAX_RSP_SEQ$_S$ for Response messages, or
MAX_RSP_SEQ$_S$ for Request messages PD=0 for Response messages

CDMA SYSTEM ACCESS STATE USING SLOT OFFSET

COMPARISON OF CDMA2000 FOR 1x AND 1xEV-DO

IS-95 Forward Link Struction

1xEV-DO Forward Link Structure

1xEV-DO NETWORK ARCHITECTURE

1xEV-DO DEFAULT PROTOCOL

1xEV-DO NON-DEFAULT PROTOCOL

1xEV-DO CONNECTION LAYER PROTOCOLS

Main channel

Assistant channels

Main channel

Assistant channels

Main channel

Assistant channels

Main channel

Assistant channels

METHOD OF TRANSMITTING DATA IN CELLULAR NETWORKS USING COOPERATIVE RELAYING

This application claims the benefit of U.S. Provisional Application No. 60/722,006, filed on Sep. 28, 2005, which is hereby incorporated by reference.

BACKGROUND OF THE INVENTION

1. Field of the Invention

The present invention relates to a method of transmitting data, and more particularly, to a method of transmitting data in cellular networks using cooperative relaying.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences.

A Broadcast Multicast Service (BCMCS) provides the ability to transmit the same information stream to multiple users simultaneously. More specifically, the BCMCS is intended to provide flexible and efficient mechanism to send common or same information to multiple users. The motivation for this service is to achieve the most efficient use of air interface and network resources when sending the same information to multiple users. The type of information transmitted can be any type of data (e.g., text, multimedia, streaming media). The BCMCS is delivered via the most efficient transmission technique based on the density of the BCMCS users, information (media type) being transmitted, and available wireless resources.

Transmission territory for each BCMCS program can be independently defined. Here, the BCMCS program refers to a logical content transmitted using the BCMCS capabilities. Moreover, the BCMCS program is composed of one or more internet protocol flows. In operation, the programs can be transmitted in time sequence on a given channel. The BCMCS programs can be transmitted to all or selected regions of the network. These regions constitute the transmission territory which refers to an area of wireless network coverage where transmission of a BCMCS program can occur. The transmission territory can be defined by a set of cells/sectors that can transmit a BCMCS program. In addition, the BCMCS programs can be received by all users or can be restricted to a subset of users via encryption.

In the BCMCS, retransmission and acknowledgement are not required since the type of transmission is "one way" and/or "one to many."

The BCMCS subscription is normally associated with the program (e.g., ABC, TNT, ESPN), not the content (media type such as music, video, etc.). That is, by selecting the program, the user selects the type of content the user wishes to receive.

The BCMCS in cellular networks typically incur coverage holes and limited capacity (channels) per carrier. This can arise due to channel propagation impairments (e.g., severe shadowing), large cell sizes (e.g., with site-to-site distances greater than 2 km) due to high cost of base terminal station (BS) deployments, limited bandwidth, and interference from adjacent cells transmitting different BCMCS content. Consequently, BCMCS coverage becomes limited along with broadcast multicast system capacity.

Further, in contrast to the conventional unicast services, the performance of the BCMCS is determined by the reception quality of the users located at the edge of the coverage area.

SUMMARY OF THE INVENTION

Accordingly, the present invention is directed to a method of transmitting data in cellular networks using cooperative relaying that substantially obviates one or more problems due to limitations and disadvantages of the related art.

An object of the present invention is to provide a method of transmitting data packets in a mobile communication system using at least one relay station (RS) and using at least two frequency carriers.

Another object of the present invention is to provide a method of transmitting data packets in a mobile communication system using at least one relay station (RS) and using a single frequency carrier.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting data packets in a mobile communication system using at least one relay station (RS) and using at least two frequency carriers includes transmitting at least one subpacket of a first data packet to a mobile station (MS) on a first frequency carrier, and transmitting at least one subpacket of a second data packet to the MS via the at least one RS. Here, the at least one subpacket of second data packet from the at least one RS is transmitted on a second frequency carrier, a first subpacket of the first data packet and a first subpacket of the second data packet is transmitted via a main channel of the first frequency carrier and the main channel of the second frequency carrier, respectively, and at least one subsequent subpacket of the first data packet and at least one subsequent subpacket of the second data packet are transmitted via at least one assistant channel of the first frequency carrier and the at least one assistant channel of the second frequency carrier, respectively.

In another aspect of the present invention, a method of transmitting data packets in a mobile communication system using at least one relay station (RS) and using a single frequency carrier includes transmitting at least one subpacket of a first data packet to a mobile station (MS), and transmitting at least one subpacket of a second data packet to the MS via the at least one RS. Here, a first subpacket of the first data packet and a first subpacket of the second data packet is transmitted via a main channel, respectively, and at least one subsequent subpacket of the first data packet and at least one subsequent subpacket of the second data packet are transmitted via at least one assistant channel, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
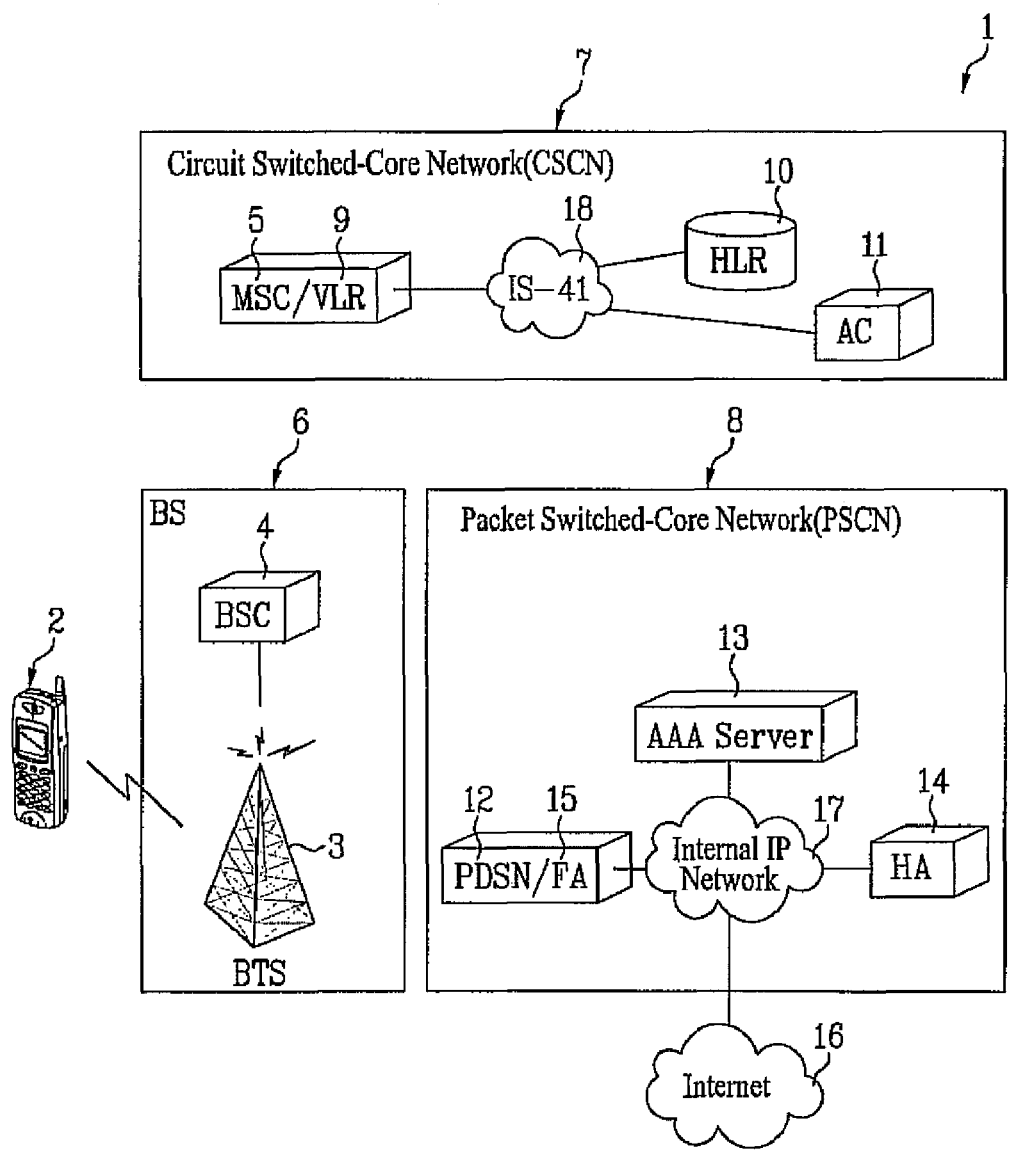
FIG. 1 illustrates wireless communication network architecture.

Referring to FIG. 1, a wireless communication network architecture 1 is illustrated. A subscriber uses a mobile station (MS) 2 to access network services. The MS 2 may be a portable communications unit, such as a hand-held cellular phone, a communication unit installed in a vehicle, or a fixed-location communications unit.

The electromagnetic waves for the MS 2 are transmitted by the Base Transceiver System (BTS) 3 also known as node B.

The BTS 3 consists of radio devices such as antennas and equipment for transmitting and receiving radio waves. The BS 6 Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the BS 6 (BS) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a MS 2 and may store information to support these capabilities. The MSC 2 may be connected to one of more BS's 6 as well as other public networks, for example a Public Switched Telephone Network (PSTN) (not shown) or Integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the MS 2. The AC 11 may be within the HLR 10 and may serve more than one HLR. The interface between the MSC 5 and the HLR/AC 10, 11 is an IS-41 standard interface 18.

The Packet data Serving Node (PDSN) 12 portion of the PSCN 8 provides routing for packet data traffic to and from MS 2. The PDSN 12 establishes, maintains, and terminates link layer sessions to the MS 2's 2 and may interface with one of more BS 6 and one of more PSCN 8.

The Authentication, Authorization and Accounting (AAA) 13 Server provides Internet Protocol authentication, authorization and accounting functions related to packet data traffic. The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address. The PDSN 12 communicates with the AAA 13, HA 14 and the Internet 16 via an Internal IP Network.

There are several types of multiple access schemes, specifically Frequency Division Multiple Access (FDMA), Time Division Multiple Access (TDMA) and Code Division Multiple Access (CDMA). In FDMA, user communications are separated by frequency, for example, by using 30 KHz channels. In TDMA, user communications are separated by frequency and time, for example, by using 30 KHz channels with 6 timeslots. In CDMA, user communications are separated by digital code.

In CDMA, All users on the same spectrum, for example, 1.25 MHz. Each user has a unique digital code identifier and the digital codes separate users to prevent interference.

A CDMA signal uses many chips to convey a single bit of information. Each user has a unique chip pattern, which is essentially a code channel. In order to recover a bit, a large number of chips are integrated according to a user's known chip pattern. Other user's code patterns appear random and are integrated in a self-canceling manner and, therefore, do not disturb the bit decoding decisions made according to the user's proper code pattern.

Figure 2A:
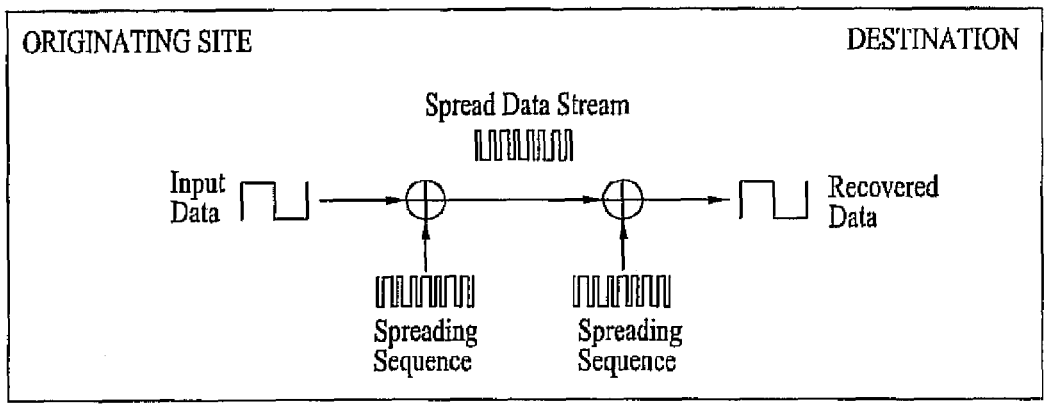
FIG. 2A illustrates a CDMA spreading and de-spreading process.
Figure 2B:
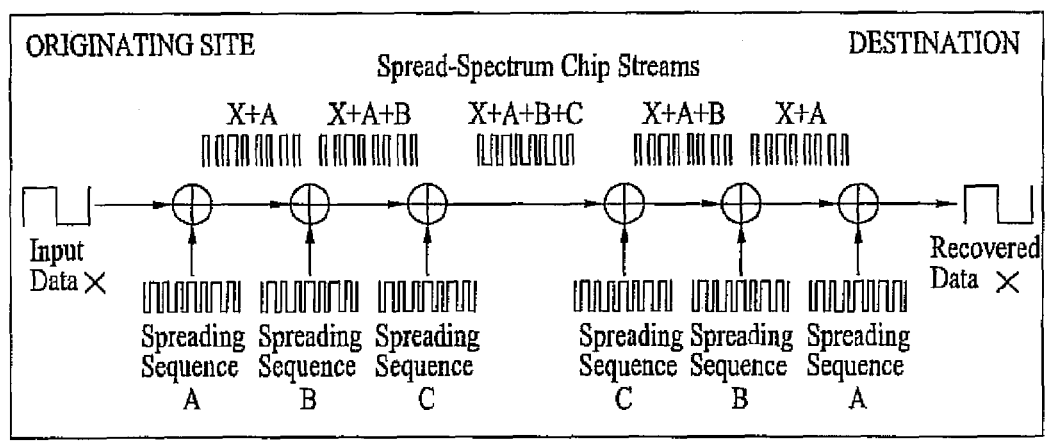
FIG. 2B illustrates a CDMA spreading and de-spreading process using multiple spreading sequences.

Input data is combined with a fast spreading sequence and transmitted as a spread data stream. A receiver uses the same spreading sequence to extract the original data. FIG. 2A illustrates the spreading and de-spreading process. As illustrated in FIG. 2B, multiple spreading sequences may be combined to create unique, robust channels.

A Walsh code is one type of spreading sequence. Each Walsh code is 64 chips long and is precisely orthogonal to all other Walsh codes. The codes are simple to generate and small enough to be stored in read only memory (ROM).

A short PN code is another type of spreading sequence. A short PN code consists of two PN sequences (I and Q), each of which is 32,768 chips long and is generated in similar, but differently tapped 15-bit shift registers. The two sequences scramble the information on the I and Q phase channels.

A long PN code is another type of spreading sequence. A long PN code is generated in a 42-bit register and is more than 40 days long, or about $4 \times 10^{13}$ chips long. Due to its length, a long PN code cannot be stored in ROM in a terminal and, therefore, is generated chip-by-chip.

Each MS 2 codes its signal with the PN long code and a unique offset, or public long code mask, computed using the long PN code ESN of 32-bits and 10 bits set by the system. The public long code mask produces a unique shift. Private long code masks may be used to enhance privacy. When integrated over as short a period as 64 chips, MS 2 with different long PN code offsets will appear practically orthogonal.

CDMA communication uses forward channels and reverse channels. A forward channel is utilized for signals from a BTS 3 to a MS 2 and a reverse channel is utilized for signals from a MS to a BTS.

A forward channel uses its specific assigned Walsh code and a specific PN offset for a sector, with one user able to have multiple channel types at the same time. A forward channel is identified by its CDMA RF carrier frequency, the unique short code PN offset of the sector and the unique Walsh code of the user. CDMA forward channels include a pilot channel, sync channel, paging channels and traffic channels.

The pilot channel is a "structural beacon" which does not contain a character stream, but rather is a timing sequence used for system acquisition and as a measurement device during handoffs. A pilot channel uses Walsh code 0.

The sync channel carries a data stream of system identification and parameter information used by MS 2 during system acquisition. A sync channel uses Walsh code 32.

There may be from one to seven paging channels according to capacity requirements. Paging channels carry pages, system parameter information and call setup orders. Paging channels use Walsh codes 1-7.

The traffic channels are assigned to individual users to carry call traffic. Traffic channels use any remaining Walsh codes subject to overall capacity as limited by noise.

A reverse channel is utilized for signals from a MS 2 to a BTS 3 and uses a Walsh code and offset of the long PN sequence specific to the MS, with one user able to transmit multiple types of channels simultaneously. A reverse channel is identified by its CDMA RF carrier frequency and the unique long code PN Offset of the individual MS 2. Reverse channels include traffic channels and access channels.

Individual users use traffic channels during actual calls to transmit traffic to the BTS 3. A reverse traffic channel is basically a user-specific public or private long code Mask and there are as many reverse traffic channels as there are CDMA terminals.

An MS 2 not yet involved in a call uses access channels to transmit registration requests, call setup requests, page responses, order responses and other signaling information. An access channel is basically a public long code offset unique to a BTS 3 sector. Access channels are paired with paging channels, with each paging channel having up to 32 access channels.

CDMA communication provides many advantages. Some of the advantages are variable rate vocoding and multiplexing, power control, use of RAKE receivers and soft handoff.

CDMA allows the use of variable rate vocoders to compress speech, reduce bit rate and greatly increase capacity. Variable rate vocoding provides full bit rate during speech, low data rates during speech pauses, increased capacity and natural sound. Multiplexing allows voice, signaling and user secondary data to be mixed in CDMA frames.

By utilizing forward power control, the BTS 3 continually reduces the strength of each user's forward baseband chip stream. When a particular MS 2 experiences errors on the forward link, more energy is requested and a quick boost of energy is supplied after which the energy is again reduced.

Using a RAKE receiver allows a MS 2 to use the combined outputs of the three traffic correlators, or "RAKE fingers," every frame. Each RAKE finger can independently recover a particular PN Offset and Walsh code. The fingers may be targeted on delayed multipath reflections of different BTS's 3, with a searcher continuously checking pilot signals.

The MS 2 drives soft handoff. The MS 2 continuously checks available pilot signals and reports to the BTS 3 regarding the pilot signals it currently sees. The BTS 3 assigns up to a maximum of six sectors and the MS 2 assigns its fingers accordingly. Al messages are sent by dim-and-burst without muting. Each end of the communication link chooses the best configuration on a frame-by-frame basis, with handoff transparent to users.

A cdma2000 system is a third-generation (3G) wideband; spread spectrum radio interface system that uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

Figure 3:
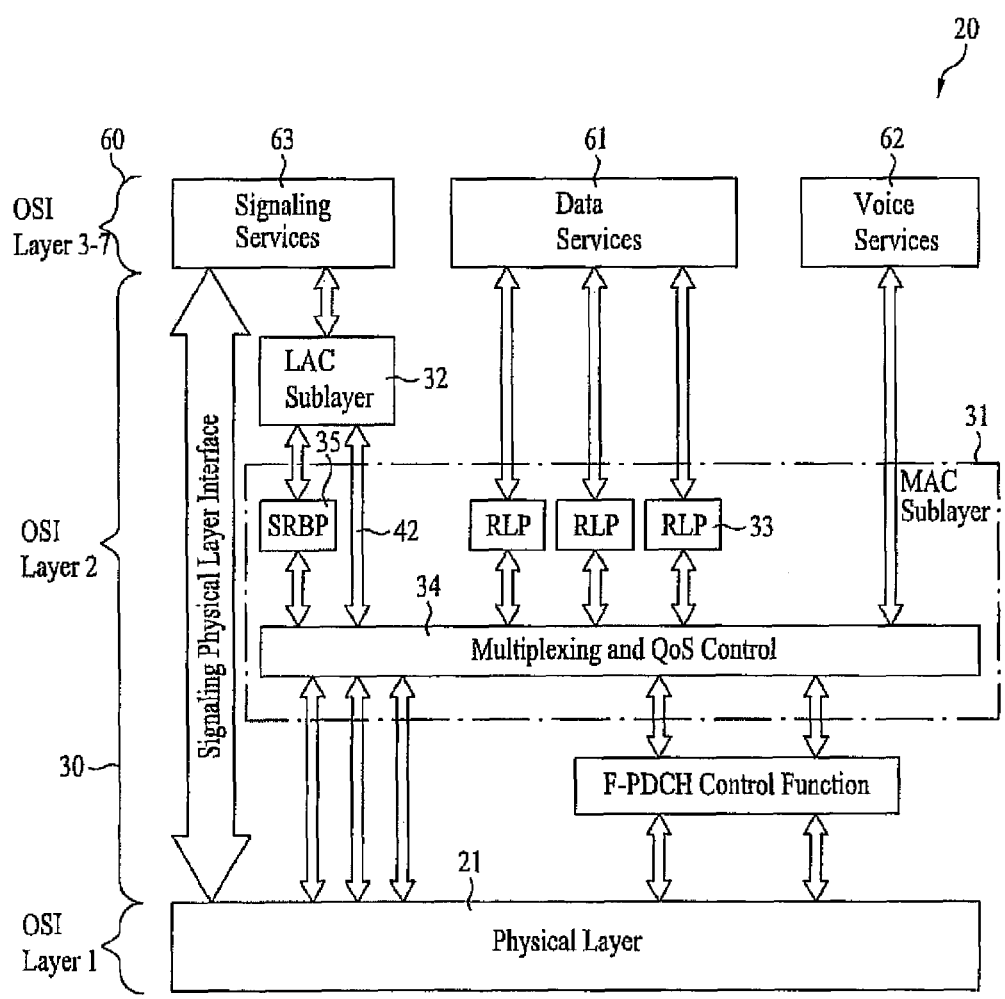
FIG. 3 illustrates a data link protocol architecture layer for a cdma2000 wireless network.

FIG. 3 illustrates a data link protocol architecture layer 20 for a cdma2000 wireless network. The data link protocol architecture layer 20 includes an Upper Layer 60, a Link Layer 30 and a Physical layer 21.

The Upper layer 60 includes three sublayers; a Data Services sublayer 61; a Voice Services sublayer 62 and a Signaling Services sublayer 63. Data services 61 are services that deliver any form of data on behalf of a mobile end user and include packet data applications such as IP service, circuit data applications such as asynchronous fax and B-ISDN emulation services, and SMS. Voice services 62 include PSTN access, mobile-to-mobile voice services, and Internet telephony. Signaling 63 controls all aspects of mobile operation.

The Signaling Services sublayer 63 processes all messages exchanged between the MS 2 and BS 6. These messages control such functions as call setup and teardown, handoffs, feature activation, system configuration, registration and authentication.

The Link Layer 30 is subdivided into the Link Access Control (LAC) sublayer 32 and the Medium Access Control (MAC) sublayer 31. The Link Layer 30 provides protocol support and control mechanisms for data transport services and performs the functions necessary to map the data transport needs of the Upper layer 60 into specific capabilities and characteristics of the Physical Layer 21. The Link Layer 30 may be viewed as an interface between the Upper Layer 60 and the Physical Layer 20.

The separation of MAC 31 and LAC 32 sublayers is motivated by the need to support a wide range of Upper Layer 60 services and the requirement to provide for high efficiency and low latency data services over a wide performance range, specifically from 1.2 Kbps to greater than 2 Mbps. Other motivators are the need for supporting high Quality of Service (QoS) delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable Link Layer 30 protocols.

The Link Access Control (LAC) sublayer 32 provides correct delivery of signaling messages. Functions include assured delivery where acknowledgement is required, unassured delivery where no acknowledgement is required, duplicate message detection, address control to deliver a message to an individual MS 2, segmentation of messages into suitable sized fragments for transfer over the physical medium, reassembly and validation of received messages and global challenge authentication.

The MAC sublayer 31 facilitates complex multimedia, multi-services capabilities of 3G wireless systems with QoS management capabilities for each active service. The MAC sublayer 31 provides procedures for controlling the access of packet data and circuit data services to the Physical Layer 21, including the contention control between multiple services from a single user, as well as between competing users in the wireless system. The MAC sublayer 31 also performs mapping between logical channels and physical channels, multiplexes data from multiple sources onto single physical channels and provides for reasonably reliable transmission over the Radio Link Layer using a Radio Link Protocol (RLP) 33 for a best-effort level of reliability. Signaling Radio Burst Protocol (SRBP) 35 is an entity that provides connectionless protocol for signaling messages. Multiplexing and QoS Control 34 is responsible for enforcement of negotiated QoS levels by mediating conflicting requests from competing services and the appropriate prioritization of access requests.

The Physical Layer 20 is responsible for coding and modulation of data transmitted over the air. The Physical Layer 20 conditions digital data from the higher layers so that the data may be transmitted over a mobile radio channel reliably.

The Physical Layer 20 maps user data and signaling, which the MAC sublayer 31 delivers over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

Figure 4:
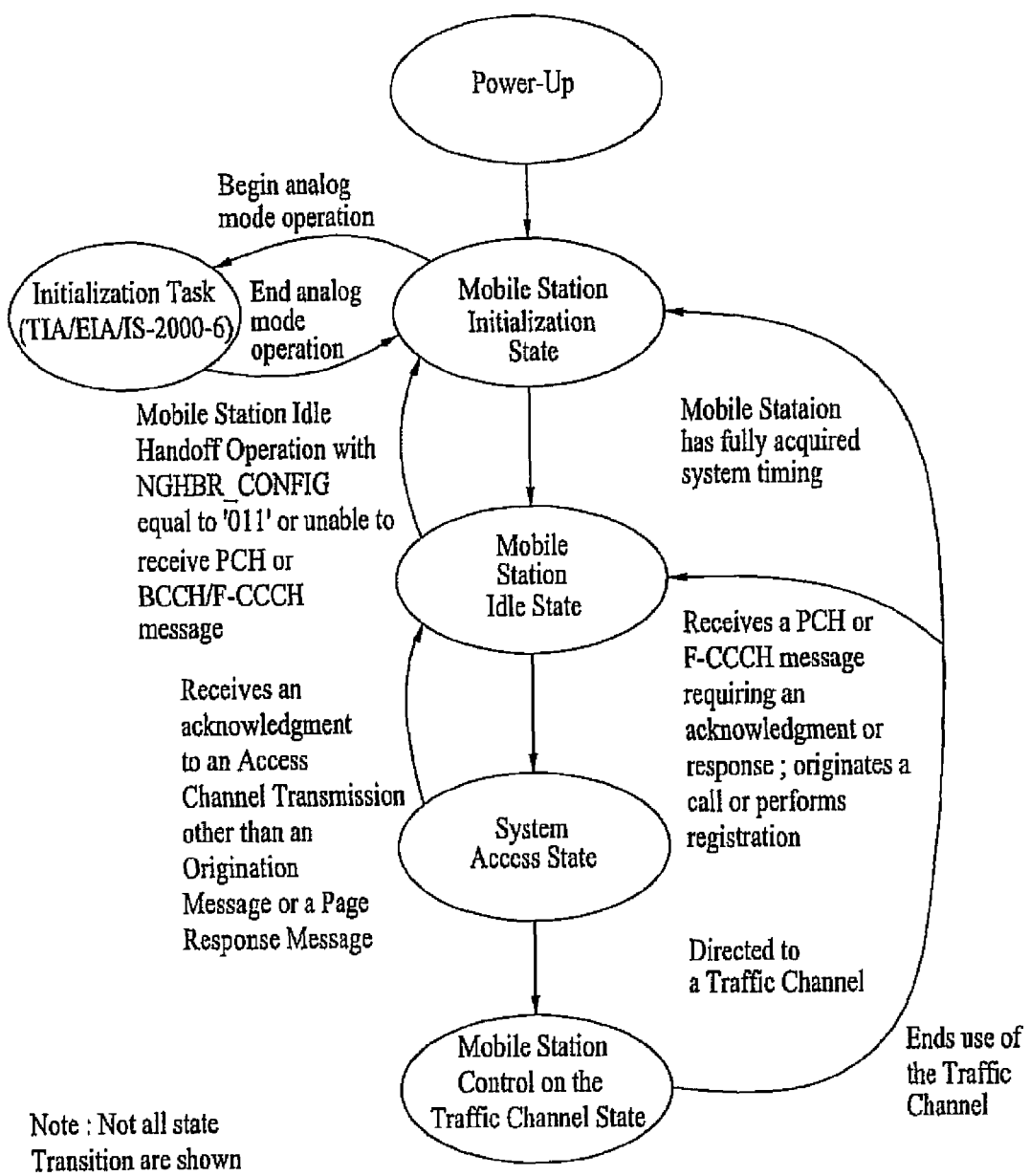
FIG. 4 illustrates cdma2000 call processing.

FIG. 4 illustrates an overview of call processing. Processing a call includes pilot and sync channel processing, paging channel processing, access channel processing and traffic channel processing.

Pilot and sync channel processing refers to the MS 2 processing the pilot and sync channels to acquire and synchronize with the CDMA system in the MS 2 Initialization State. Paging channel processing refers to the MS 2 monitoring the paging channel or the forward common control channel (F-CCCH) to receive overhead and mobile-directed messages from the BS 6 in the Idle State. Access channel processing refers to the MS 2 sending messages to the BS 6 on the access channel or the Enhanced access channel in the System Access State, with the BS 6 always listening to these channels and responding to the MS on either a paging channel or the F-CCCH. Traffic channel processing refers to the BS 6 and MS 2 communicating using dedicated forward and reverse traffic channels in the MS 2 Control on Traffic Channel State, with the dedicated forward and reverse traffic channels carrying user information, such as voice and data.

Figure 5:
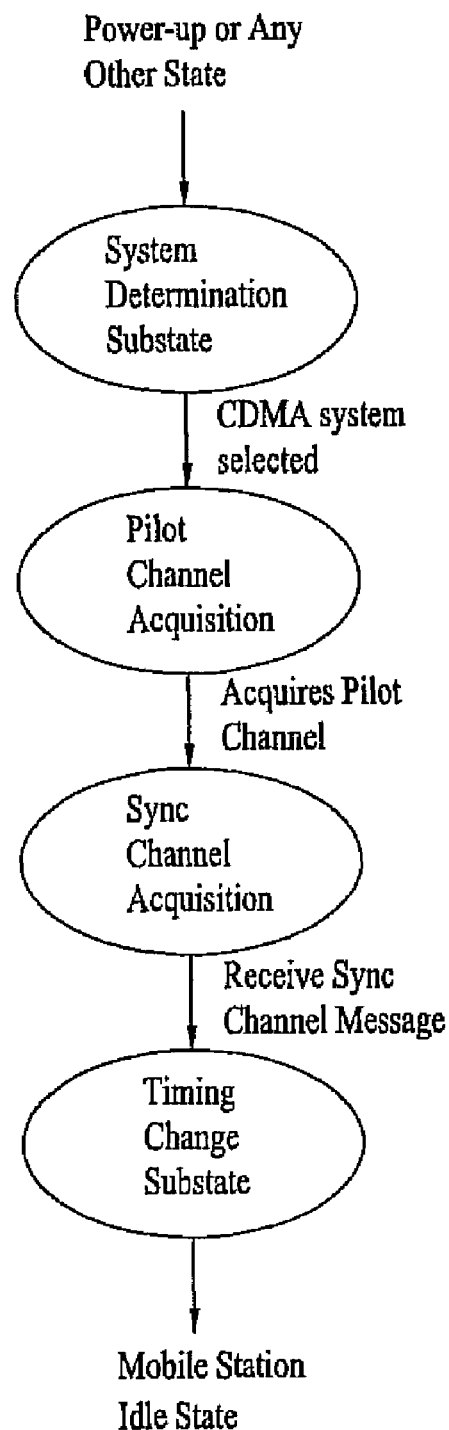
FIG. 5 illustrates the cdma2000 initialization state.

FIG. 5 illustrates the initialization state of a MS 2. The Initialization state includes a System Determination Substate, Pilot Channel Acquisition, Sync Channel Acquisition, a Timing Change Substate and a Mobile Station Idle State.

System Determination is a process by which the MS 2 decides from which system to obtain service. The process could include decisions such as analog versus digital, cellular versus PCS, and A carrier versus B carrier. A custom selection process may control System Determination. A service provider using a redirection process may also control System determination. After the MS 2 selects a system, it must determine on which channel within that system to search for service. Generally the MS 2 uses a prioritized channel list to select the channel.

Pilot Channel Processing is a process whereby the MS 2 first gains information regarding system timing by searching for usable pilot signals. Pilot channels contain no information, but the MS 2 can align its own timing by correlating with the pilot channel. Once this correlation is completed, the MS 2 is synchronized with the sync channel and can read a sync channel message to further refine its timing. The MS 2 is permitted to search up to 15 seconds on a single pilot channel before it declares failure and returns to System Determination to select either another channel or another system. The searching procedure is not standardized, with the time to acquire the system depending on implementation.

In cdma2000, there may be many pilot channels, such as OTD pilot, STS pilot and Auxiliary pilot, on a single channel. During System Acquisition, the MS 2 will not find any of these pilot channels because they are use different Walsh codes and the MS is only searching for Walsh 0.

The sync channel message is continuously transmitted on the sync channel and provides the MS 2 with the information to refine timing and read a paging channel. The mobile receives information from the BS 6 in the sync channel message that allows it to determine whether or not it will be able to communicate with that BS.

In the Idle State, the MS 2 receives one of the paging channels and processes the messages on that channel. Overhead or configuration messages are compared to stored sequence numbers to ensure the MS 2 has the most current parameters. Messages to the MS 2 are checked to determine the intended subscriber.

The BS 6 may support multiple paging channels and/or multiple CDMA channels (frequencies). The MS 2 uses a hash function based on its IMSI to determine which channel and frequency to monitor in the Idle State. The BS 6 uses the same hash function to determine which channel and frequency to use when paging the MS 2.

Using a Slot Cycle Index (SCI) on the paging channel and on F-CCCH supports slotted paging. The main purpose of slotted paging is to conserve battery power in MS 2. Both the MS 2 and BS 6 agree in which slots the MS will be paged. The MS 2 can power down some of its processing circuitry during unassigned slots. Either the General Page message or the Universal Page message may be used to page the mobile on F-CCCH. A Quick paging channel that allows the MS 2 to power up for a shorter period of time than is possible using only slotted paging on F-PCH or F-CCCH is also supported.

Figure 6:
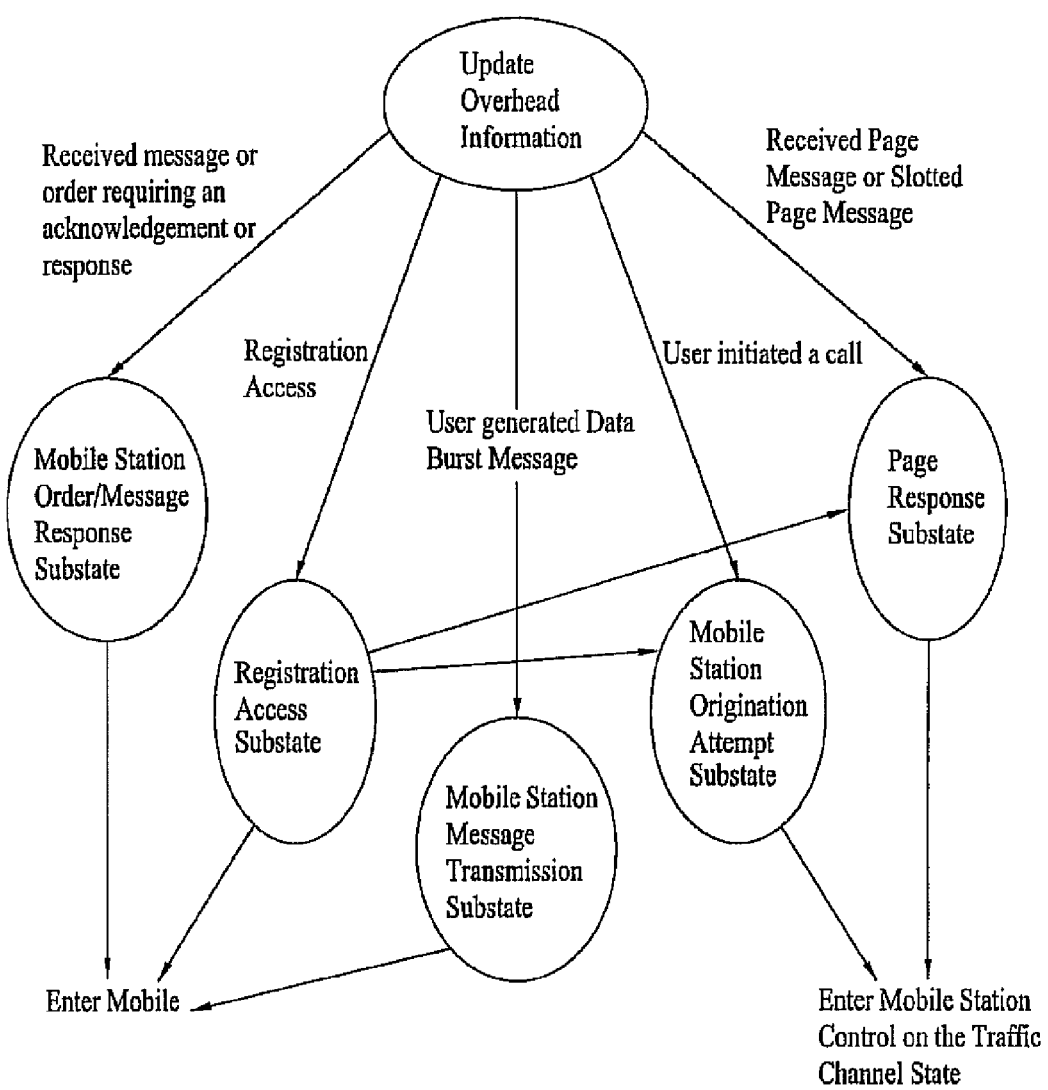
FIG. 6 illustrates the cdma2000 system access state.

FIG. 6 illustrates the System Access state. The first step in the system access process is to update overhead information to ensure that the MS 2 is using the correct access channel parameters, such as initial power level and power step increments. A MS 2 randomly selects an access channel and transmits without coordination with the BS 6 or other MS. Such a random access procedure can result in collisions. Several steps can be taken to reduce the likelihood of collision, such as use of a slotted structure, use of a multiple access channel, transmitting at random start times and employing congestion control, for example, overload classes.

The MS 2 may send either a request or a response message on the access channel. A request is a message sent autonomously, such as an Origination message. A response is a message sent in response to a message received from the BS 6. For example, a Page Response message is a response to a General Page message or a Universal message.

Figure 7:
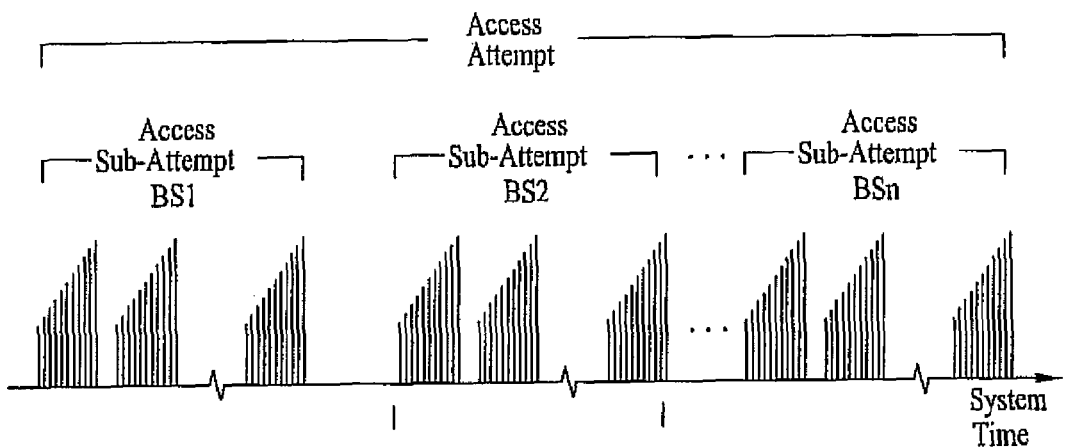
FIG. 7 illustrates a conventional cdma2000 access attempt.
Figure 8:
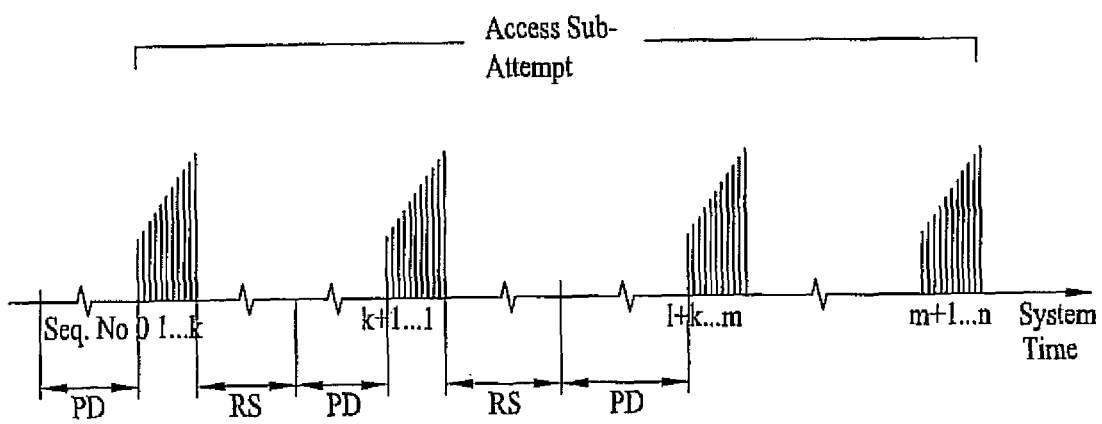
FIG. 8 illustrates a conventional cdma2000 access sub-attempt.
Figure 9:
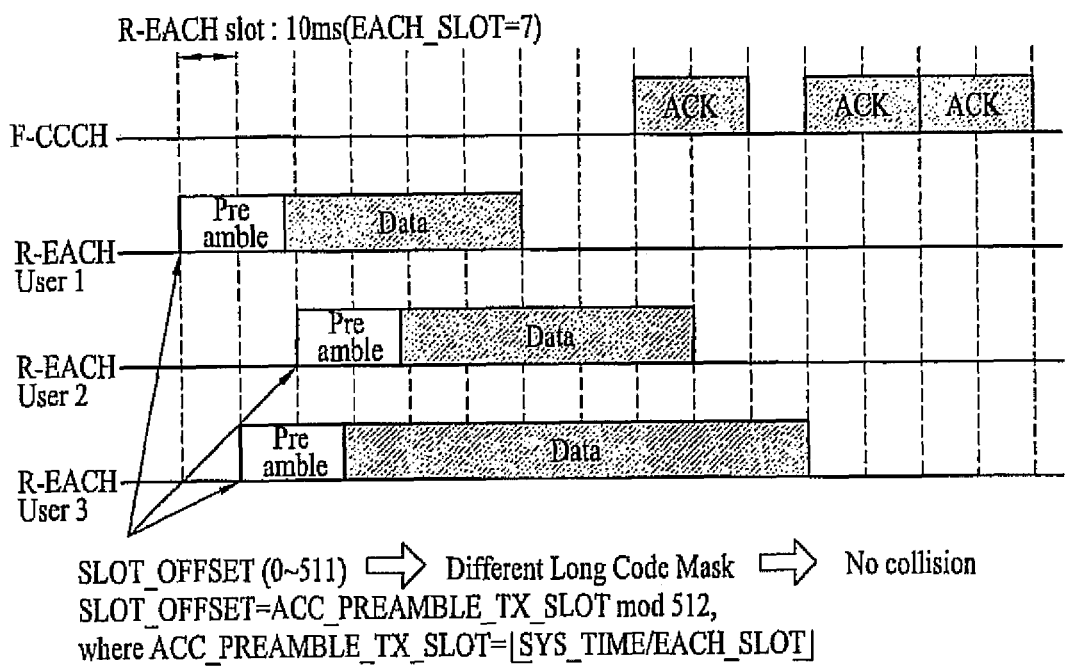
FIG. 9 illustrates the conventional cdma2000 system access state using slot offset.

An access attempt, which refers to the entire process of sending one Layer 2 encapsulated PDU and receiving an acknowledgment for the PDU, consists of one or more access sub-attempts, as illustrated in FIG. 7. An access sub-attempt includes of a collection of access probe sequences, as illustrated in FIG. 8. Sequences within an access sub-attempt are separated by a random backoff interval (RS) and a persistence delay (PD). PD only applies to access channel request, not response. FIG. 9 illustrates a System Access state in which collisions are avoided by using a slot offset of 0-511 slots.

The Multiplexing and QoS Control sublayer 34 has both a transmitting function and a receiving function. The transmitting function combines information from various sources, such as Data Services 61, Signaling Services 63 or Voice Services 62, and forms Physical layer SDUs and PDCHCF SDUs for transmission. The receiving function separates the information contained in Physical Layer 21 and PDCHCF SDUs and directs the information to the correct entity, such as Data Services 61, Upper Layer Signaling 63 or Voice Services 62.

The Multiplexing and QoS Control sublayer 34 operates in time synchronization with the Physical Layer 21. If the Physical Layer 21 is transmitting with a non-zero frame offset, the Multiplexing and QoS Control sublayer 34 delivers Physical Layer SDUs for transmission by the Physical Layer at the appropriate frame offset from system time.

The Multiplexing and QoS Control sublayer 34 delivers a Physical Layer 21 SDU to the Physical Layer using a physical-channel specific service interface set of primitives. The Physical Layer 21 delivers a Physical Layer SDU to the Multiplexing and QoS Control sublayer 34 using a physical channel specific Receive Indication service interface operation.

The SRBP Sublayer 35 includes the sync channel, forward common control channel, broadcast control channel, paging channel and access channel procedures.

The LAC Sublayer 32 provides services to Layer 3 60. SDUs are passed between Layer 3 60 and the LAC Sublayer 32. The LAC Sublayer 32 provides the proper encapsulation of the SDUs into LAC PDUs, which are subject to segmentation and reassembly and are transferred as encapsulated PDU fragments to the MAC Sublayer 31.

Processing within the LAC Sublayer 32 is done sequentially, with processing entities passing the partially formed LAC PDU to each other in a well-established order. SDUs and PDUs are processed and transferred along functional paths, without the need for the upper layers to be aware of the radio characteristics of the physical channels. However, the upper layers could be aware of the characteristics of the physical channels and may direct Layer 2 30 to use certain physical channels for the transmission of certain PDUs.

Figure 10:
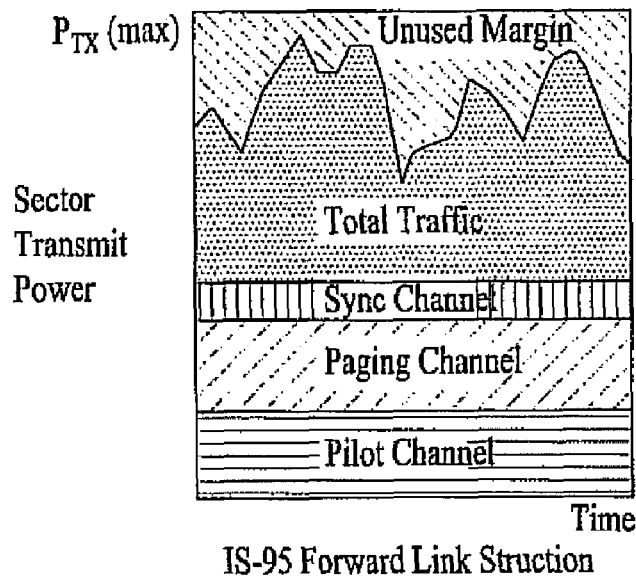
FIG. 10 illustrates a comparison of cdma2000 for 1x and 1xEV-DO.
Figure 10:
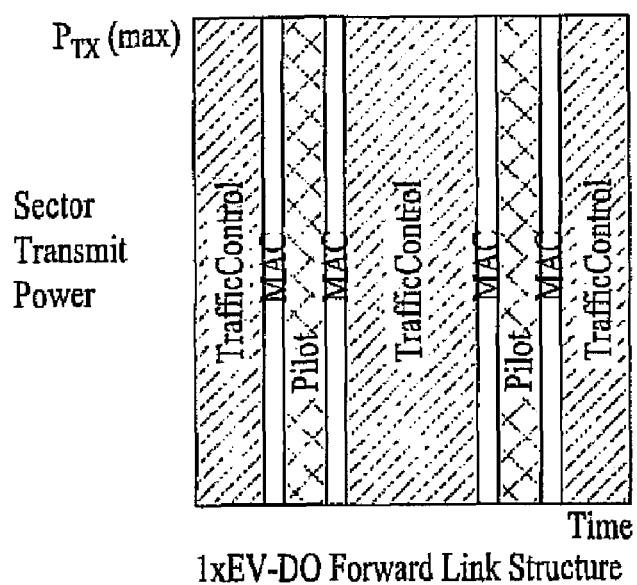

A 1xEV-DO system is optimized for packet data service and characterized by a single 1.25 MHz carrier ("1") for data only or data Optimized ("DO"). Furthermore, there is a peak data rate of 2.4 Mbps or 3.072 Mbps on the forward Link and 153.6 Kbps or 1.8432 Mbps on the reverse Link. Moreover, a 1xEV-DO system provides separated frequency bands and internetworking with a 1x System. FIG. 10 illustrates a comparison of cdma2000 for a 1x system and a 1xEV-DO system.

In CDMA2000, there are concurrent services, whereby voice and data are transmitted together at a maximum data rate of 614.4 kbps and 307.2 kbps in practice. An MS 2 communicates with the MSC 5 for voice calls and with the PDSN 12 for data calls, A cdma2000 system is characterized by a fixed rate with variable power with a Walsh-code separated forward traffic channel.

In a 1xEV-DO system, the maximum data rate is 2.4 Mbps or 3.072 Mbps and there is no communication with the circuit-switched core network 7. A 1xEV-DO system is characterized by fixed power and a variable rate with a single forward channel that is time division multiplexed.

Figure 11:
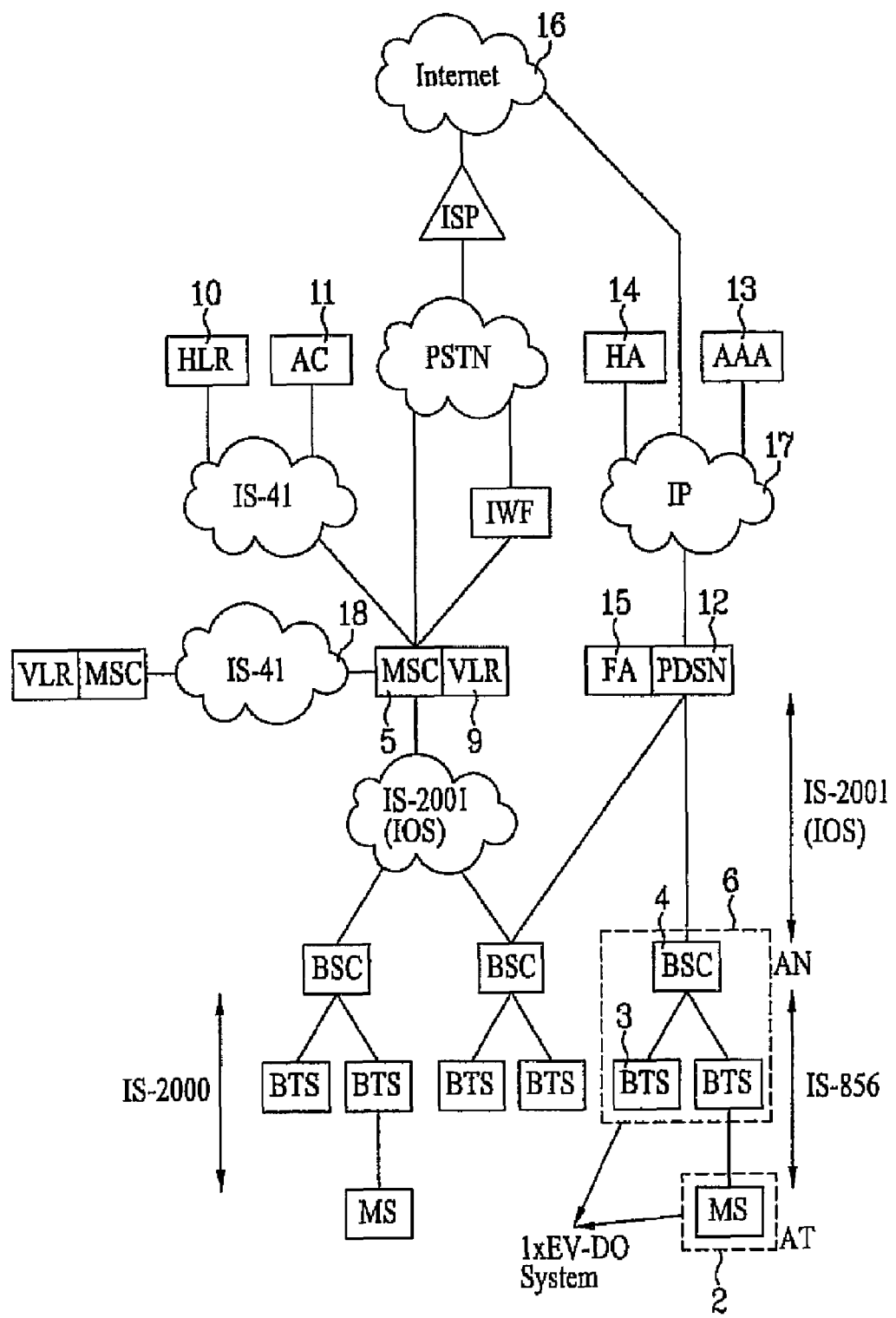
FIG. 11 illustrates a network architecture layer for a 1xEV-DO wireless network.
Figure 12:
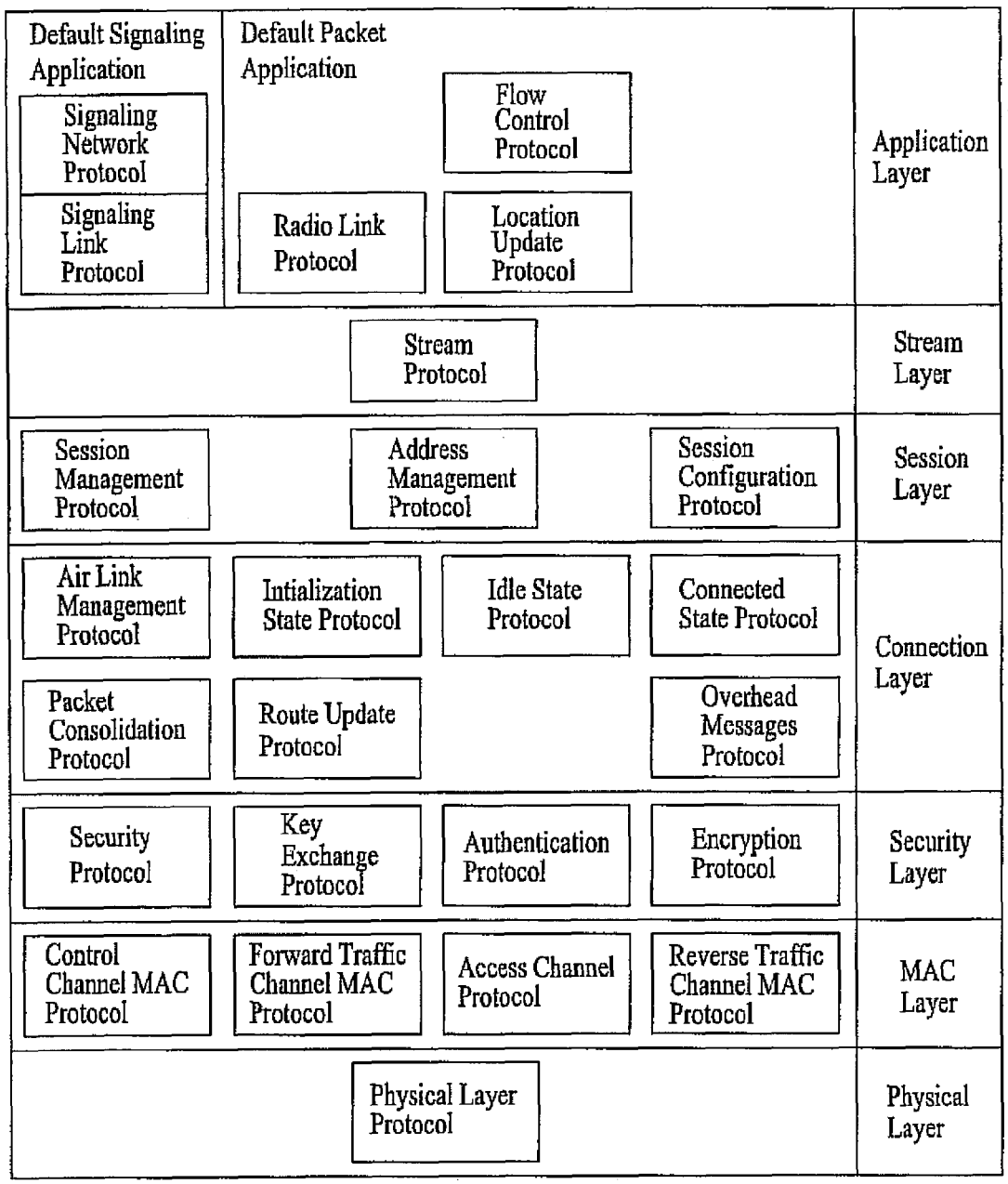
FIG. 12 illustrates 1xEV-DO default protocol architecture.
Figure 13:
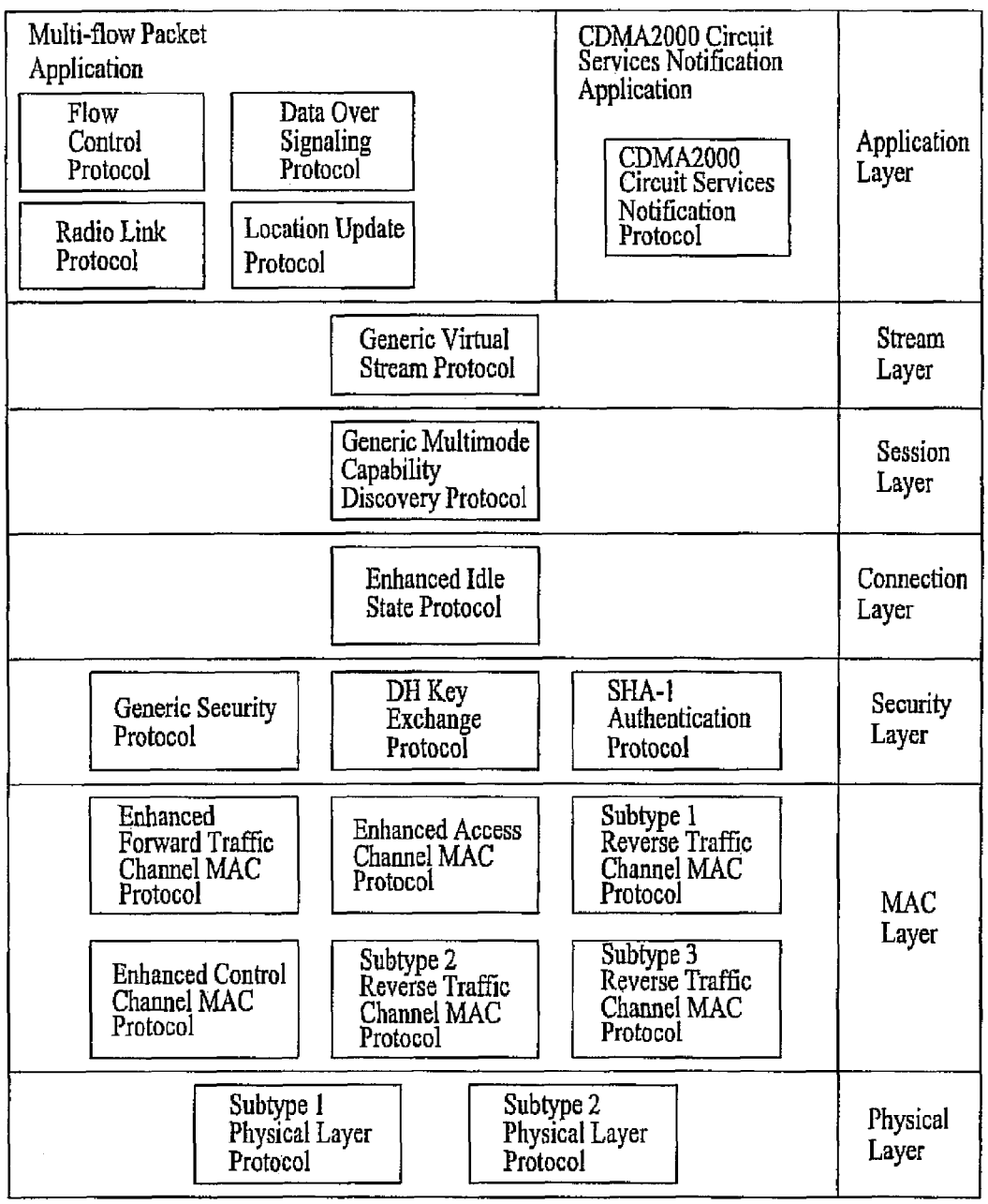
FIG. 13 illustrates 1xEV-DO non-default protocol architecture.

FIG. 11 illustrates a 1xEV-DO system architecture. In a 1xEV-DO system, a frame consists of 16 slots, with 600 slots/sec, and has a duration of 26.67 ms, or 32,768 chips. A single slot is 1.6667 ms long and has 2048 chips. A control/traffic channel has 1600 chips in a slot, a pilot channel has 192 chips in a slot and a MAC channel has 256 chips in a slot. A 1xEV-DO system facilitates simpler and faster channel estimation and time synchronization, FIG. 12 illustrates a 1xEV-DO default protocol architecture. FIG. 13 illustrates a 1xEV-DO non-default protocol architecture.

Information related to a session in a 1xEV-DO system includes a set of protocols used by an MS 2, or access terminal (AT), and a BS 6, or access network (AN), over an airlink, a Unicast Access Terminal Identifier (UATI), configuration of the protocols used by the AT and AN over the airlink and an estimate of the current AT location.

The Application Layer provides best effort, whereby the message is sent once, and reliable delivery, whereby the message can be retransmitted one or more times. The stream layer provides the ability to multiplex up to 4 (default) or 255 (non-default) application streams for one AT 2.

The Session Layer ensures the session is still valid and manages closing of session, specifies procedures for the initial UATI assignment, maintains AT addresses and negotiates/provisions the protocols used during the session and the configuration parameters for these protocols.

Figure 14:
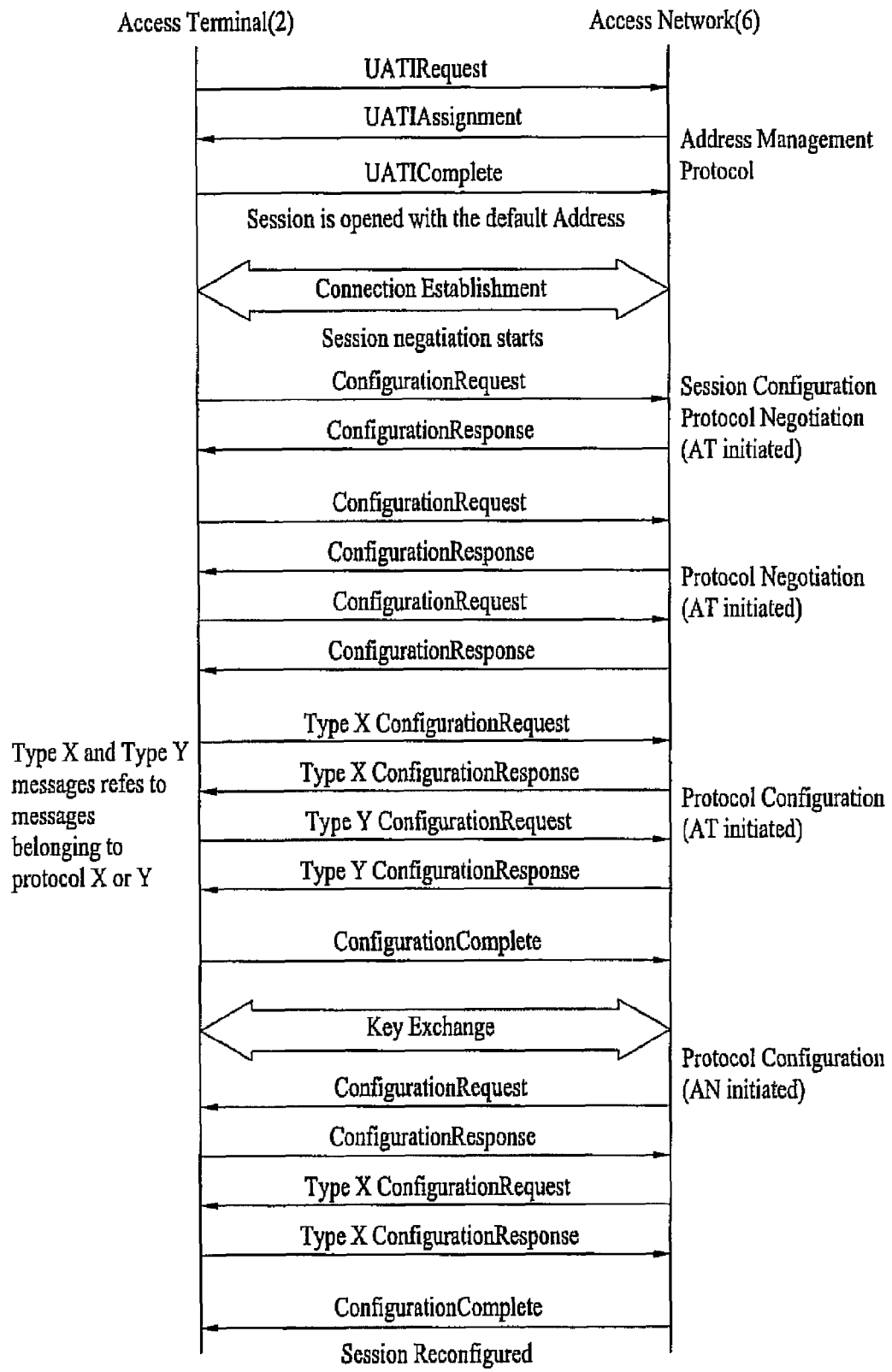
FIG. 14 illustrates 1xEV-DO session establishment.

FIG. 14 illustrates the establishment of a 1xEV-DO session. As illustrated in FIG. 14, establishing a session includes address configuration, connection establishment, session configuration and exchange keys.

Address configuration refers to an Address Management protocol assigning a UATI and Subnet mask. Connection establishment refers to Connection Layer Protocols setting up a radio link. Session configuration refers to a Session Configuration Protocol configuring all protocols. Exchange key refers a Key Exchange protocol in the Security Layer setting up keys for authentication.

A "session" refers to the logical communication link between the AT 2 and the RNC, which remains open for hours, with a default of 54 hours. A session lasts until the PPP session is active as well. Session information is controlled and maintained by the RNC in the AN 6.

When a connection is opened, the AT 2 can be assigned the forward traffic channel and is assigned a reverse traffic channel and reverse power control channel. Multiple connections may occur during single session.

The Connection Layer manages initial acquisition of the network and communications, Furthermore, the Connection Layer maintains an approximate AT 2 location and manages a radio link between the AT 2 and the AN 6. Moreover, the Connection Layer performs supervision, prioritizes and encapsulates transmitted data received from the Session Layer, forwards the prioritized data to the Security Layer and decapsulates data received from the Security Layer and forwards it to the Session Layer.

Figure 15:
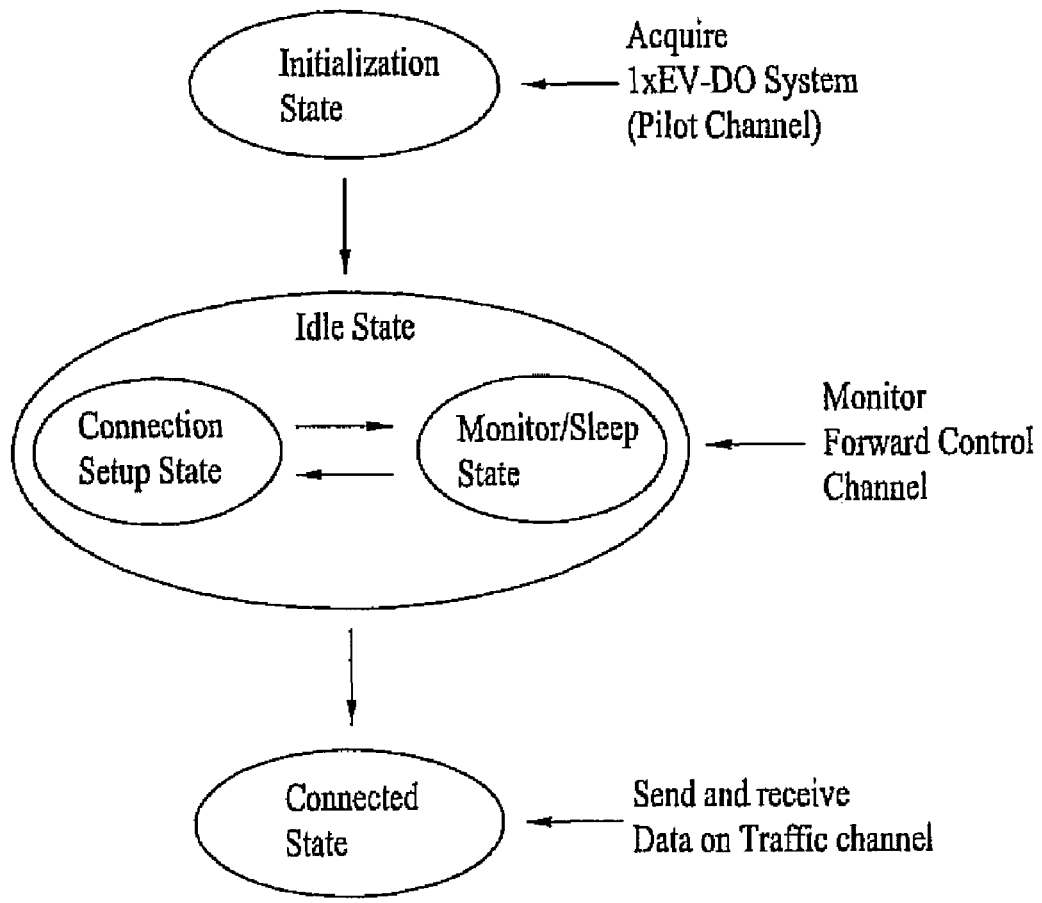
FIG. 15 illustrates 1xEV-DO connection layer protocols.

FIG. 15 illustrates Connection Layer Protocols.

In the Initialization State, the AT 2 acquires the AN 6 and activates the initialization State Protocol. In the Idle State, a closed connection is initiated and the Idle State Protocol is activated. In the Connected State, an open connection is initiated and the Connected State Protocol is activated.

A closed connection refers to a state where the AT 2 is not assigned any dedicated air-link resources and communications between the AT and AN 6 are conducted over the access channel and the control channel. An open connection refers to a state where the AT 2 can be assigned the forward traffic channel, is assigned a reverse power control channel and a reverse traffic channel and communication between the AT 2 and AN 6 is conducted over these assigned channels as well as over the control channel.

The Initialization State Protocol performs actions associated with acquiring an AN 6. The Idle State Protocol performs actions associated with an AT 2 that has acquired an AN 6, but does not have an open connection, such as keeping track of the AT location using a Route Update Protocol. The Connected State Protocol performs actions associated with an AT 2 that has an open connection, such as managing the radio link between the AT and AN 6 and managing the procedures leading to a closed connection. The Route Update Protocol performs actions associated with keeping track of the AT 2 location and maintaining the radio link between the AT and AN 6. The Overhead Message Protocol broadcasts essential parameters, such as QuickConfig, SectorParameters and AccessParameters message, over the control channel. The Packet Consolidation Protocol consolidates and prioritizes packets for transmission as a function of their assigned priority and the target channel as well as providing packet de-multiplexing on the receiver.

The Security Layer includes a key exchange function, authentication function and encryption function. The key exchange function provides the procedures followed by the AN 2 and AT 6 for authenticating traffic. The authentication function provides the procedures followed by the AN 2 and AT 6 to exchange security keys for authentication and encryption. The encryption function provides the procedures followed by the AN 2 and AT 6 for encrypting traffic.

The 1xEV-DO forward Link is characterized in that no power control and no soft handoff is supported. The AN 6 transmits at constant power and the AT 2 requests variable rates on the forward Link. Because different users may transmit at different times in TDM, it is difficult to implement diversity transmission from different BS's 6 that are intended for a single user.

In the MAC Layer, two types of messages originated from higher layers are transported across the physical layer, specifically a User data message and a signaling message. Two protocols are used to process the two types of messages, specifically a forward traffic channel MAC Protocol for the User data message and a control channel MAC Protocol, for the signaling message.

The Physical Layer is characterized by a spreading rate of 1.2288 Mcps, a frame consisting of 16 slots and 26.67 ms, with a slot of 1.67 ms and 2048 chips. The forward Link channel includes a pilot channel, a forward traffic channel or control channel and a MAC channel.

The pilot channel is similar to the to the cdma2000 pilot channel in that it comprises all "0" information bits and Walsh-spreading with W0 with 192 chips for a slot.

The forward traffic channel is characterized by a data rate that varies from 38.4 kbps to 2.4576 Mbps or from 4.8 kbps to 3.072 Mbps. Physical Layer packets can be transmitted in 1 to 16 slots and the transmit slots use 4-slot interlacing when more than one slot is allocated. If ACK is received on the reverse Link ACK channel before all of the allocated slots have been transmitted, the remaining slots shall not be transmitted.

The control channel is similar to the sync channel and paging channel in cdma2000. The control channel is characterized by a period of 256 slots or 427.52 ms, a Physical Layer packet length of 1024 bits or 128, 256, 512 and 1024 bits and a data rate of 38.4 kbps or 76.8 kbps or 19.2 kbps, 38.4 kbps or 76.8 kbps.

The 1xEV-DO reverse link is characterized in that the AN 6 can power control the reverse Link by using reverse power control and more than one AN can receive the AT's 2 transmission via soft handoff. Furthermore, there is no TDM on the reverse Link, which is channelized by Walsh code using a long PN code.

An access channel is used by the AT 2 to initiate communication with the AN 6 or to respond to an AT directed message. Access channels include a pilot channel and a data channel.

An AT 2 sends a series of access probes on the access channel until a response is received from the AN 6 or a timer expires. An access probe includes a preamble and one or more access channel Physical Layer packets. The basic data rate of the access channel is 9.6 kbps, with higher data rates of 19.2 kbps and 38.4 kbps available.

When more that one AT 2 is paged using the same Control channel packet, Access Probes may be transmitted at the same time and packet collisions are possible. The problem can be more serious when the ATs 2 are co-located, are in a group call or have similar propagation delays.

One reason for the potential of collision is the inefficiency of the current persistence test in conventional methods. Because an AT 2 may require a short connection setup time, a paged AT may transmit access probes at the same time as another paged AT when a persistence test is utilized.

Conventional methods that use a persistence test are not sufficient since each AT 2 that requires a short connection setup times and/or is part of a group call may have the same persistence value, typically set to 0. If AT's 2 are co-located, such as In a group call, the Access Probes arrive at the An 6 at the same time, thereby resulting in access collisions and increased connection setup time.

Therefore, there is a need for a more efficient approach for access probe transmission from co-located mobile terminals requiring short connection times. The present invention addresses this and other needs such as interference cancellation.

With respect to the BCMCS, the broadcast contents generated from the BS and/or contents delivered from other BS are transmitted to a plurality of mobile stations in the BS cell/sector. Before the contents using the BCMCS can be transmitted, the BS and the MS share a same protocol. Here, the BCMCS can provided in a zone-based manner, and zone can be defined as the area in which the same BCMCS contents are provided.

Although the BCMCS data is transmitted on the packet data channel, since BCMCS uses a transmission scheme where a BS transmits to a plurality of mobile stations, there is no independent received signal quality feedback from each MS. For example, even if there is error in the received data packet, the MS does not send an acknowledgment (ACK) or a negative ACK (NACK) signals to the BS.

Furthermore, the BS performing the BCMCS seeks to make all the mobile stations in the BS cell/sector receive the data having a certain level of quality by determining the data transmission rate. The data transmission rate can be determined based on payload size, a number of sub-packets for a Hybrid Automatic Repeat Request (HARQ) scheme, modulation scheme, and a like.

As mentioned above, since the BCMCS service does not send feedback from the receiving end, the BS cannot modify data transmission rate according to the channel environment and sends the data packet at a fixed rate to all the mobile stations in the cell/sector. Furthermore, each BS can set the data rate where a packet error rate (PER) value is lower than the standard value for all the mobile stations in the cell/sector. The data packet is then sent at the fixed or set data rate.

For example, the BCMCS is executed with higher data rate by the BS having a good channel condition (based on fading, interference, and cell radius). For a BS having a poor channel condition, the BCMCS is executed with lower data rate. As discussed above, if the service is provided based on each BS having its own fixed data rate, channel quality degradation cannot be dealt with, and consequently, the service quality can suffer.

The BCMCS includes various functions. A subscription management function supports the capability to subscribe a user for broadcast/multicast service. After the MS is subscribed to the system, a service discovery function can be used to discover the BCMCS program. That is, the service discovery function refers to the procedure a mobile station (MS) employs to discover the BCMCS programs that can be provided by the system. For example, an announcement of a BCMCS program can be automatically sent to the BCMCS capable MS (e.g., a background light blinking a specified number of times whenever a MS enters a broadcast range or whenever a broadcast program commences).

During operation, an information acquisition function allows the user to acquire the information needed to receive a BCMCS program. Furthermore, a distribution management function provides the system the ability to determine the locations where the BCMCS program is transmitted. As another service function, a radio management function deals with efficient operation of the radio channels to support the BCMCS. Also, a service accounting function includes aspects of the service related to billing based on the services rendered. Lastly, a feature interaction function relates to the aspects of initiating and operating the BCMCS service simultaneously with other services.

Figure 16:
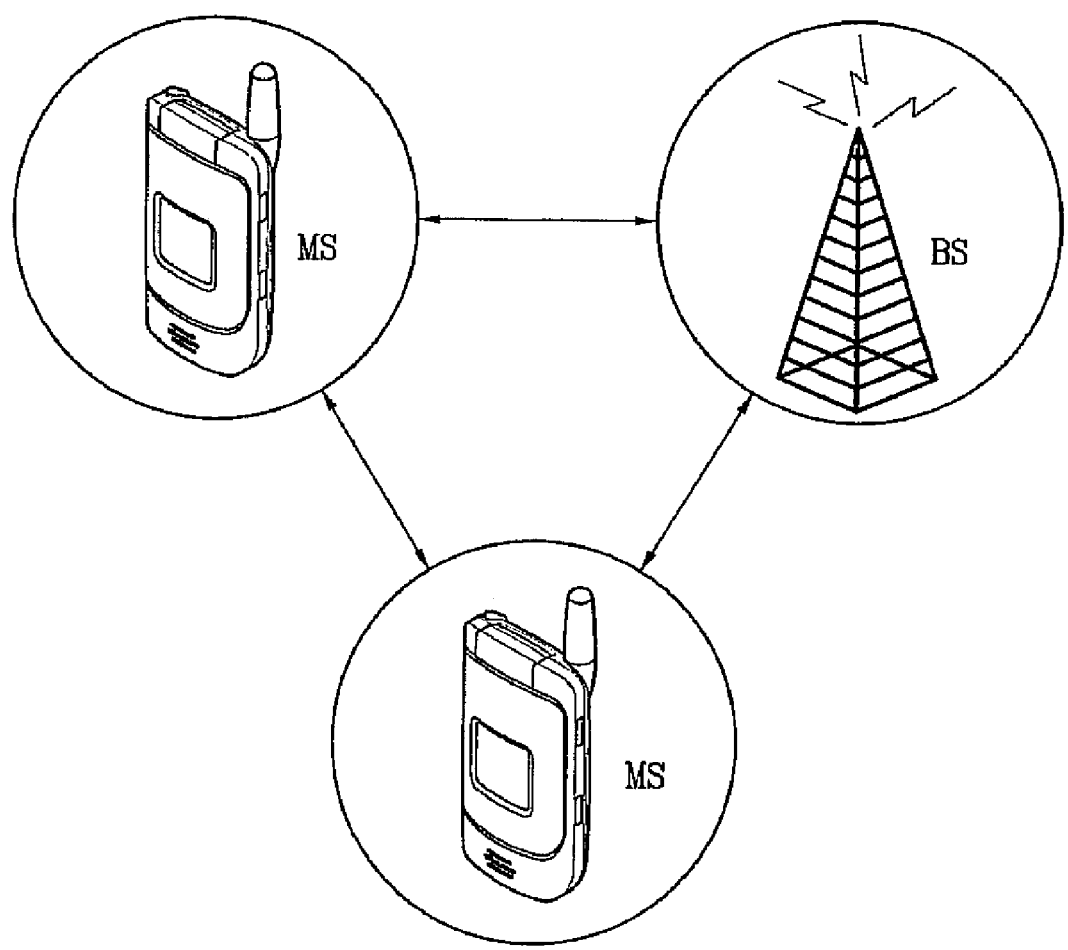
FIG. 16 illustrates a plurality of modules that are respectively one hop apart.

Current cellular communications are based on a single hop transmission between modules or entities—from a base station (BS) to a mobile station (MS) or from the MS to the BS. The single hop network refers to a network architecture where all entities/modules are a maximum of one hop apart. FIG. 16 illustrates a plurality of modules that are respectively one hop apart. In FIG. 16, two MSs and a BS are one hop apart, respectively.

By integrating a relay station (RS) into the existing cellular architecture can provide benefits such as coverage and capacity enhancements. The coverage enhancement can provide improved signal reception quality to the users at the edge of a sector or a cell.

Figure 17:
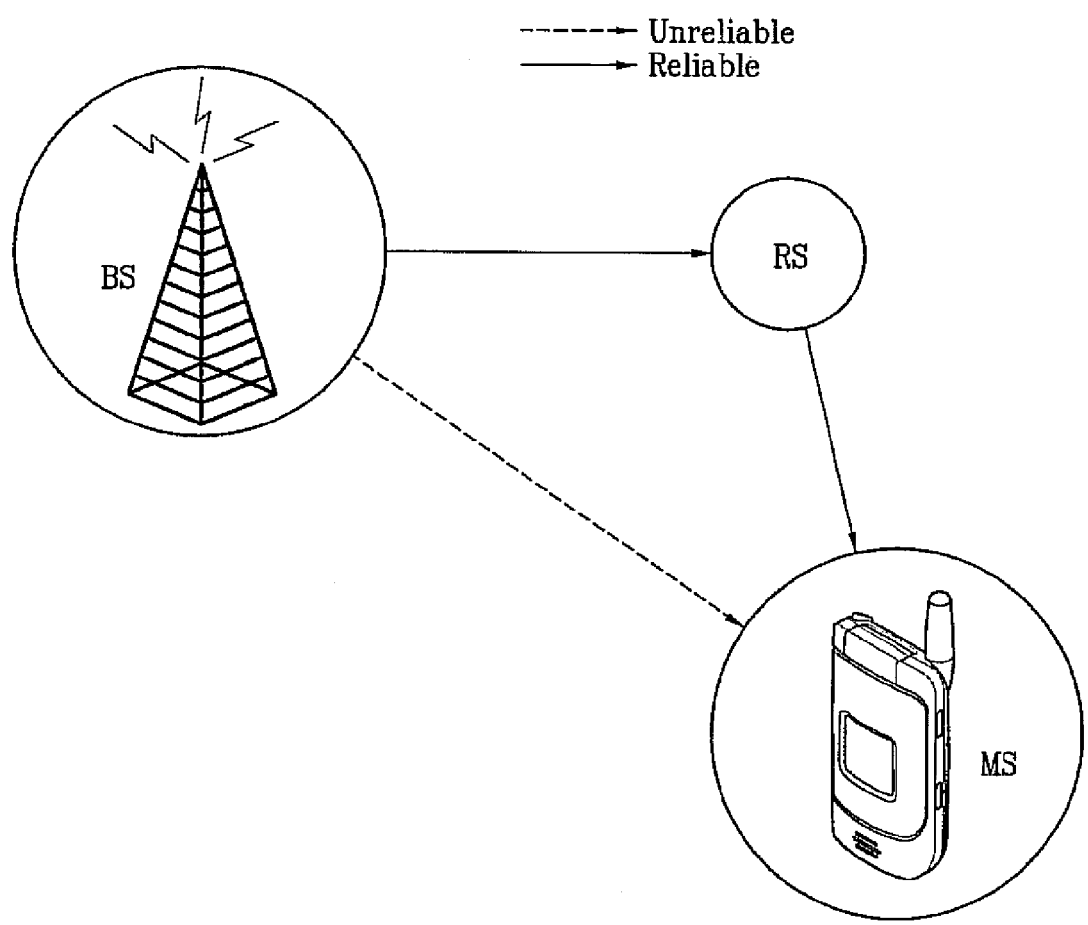
FIG. 17 is a diagram illustrating an example of a RS in a multi-hop system.

FIG. 17 is a diagram illustrating an example of a RS in a multi-hop system. As shown in FIG. 17, the RS is placed between the BS and the MS. Because the signal from the BS to the BS may be unreliable if the MS is located near the cell border or on the edge of the coverage area due to weakened signal strength or interference due to signals from neighboring cells/sectors, the RS can be used to resolve the weak signal. The distance between the BS to the RS is shorter than the distance between the BS and the MS. As such, the signal from the BS to the RS is reliable, and consequently, the signal from the RS to the MS is also reliable.

The function of the RS is to 'repeat' the signal from the BS in a trivial or a smart manner so as to extend the BCMCS coverage. With the extended BCMCS coverage by employing the RS, however, the MS's, that would otherwise unable to receive strong enough signal, can demodulate and decode the BCMCS signal.

As mentioned above, the function of the RS can be accomplished in a trivial or smart manner, for example. The trivial manner refers to relaying the signal through simple signal repetition. Alternatively, the smart manner refers to employing space-time coding to achieve transmit diversity or incremental redundancy (IR).

Figure 18:
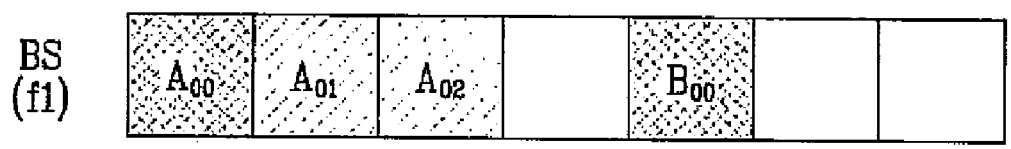
FIG. 18 illustrates a scheme for a relayed BCMCS according to an embodiment of the present invention.
Figure 18:
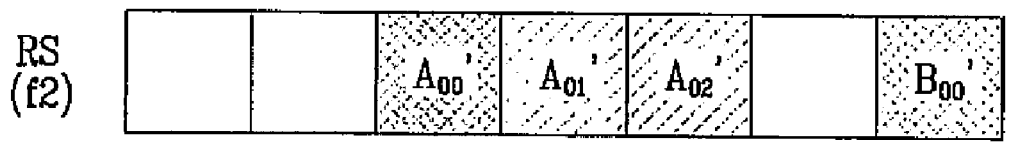
Figure 18:
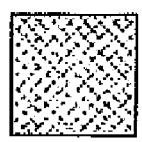
Figure 18:
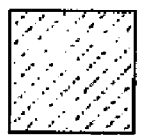

FIG. 18 illustrates a scheme for a relayed BCMCS according to an embodiment of the present invention. The basic unit for subpacket or packet transmission is slot. Referring to FIG. 18, a multi-hop, multi-carrier system having two frequency carriers, represented by f1 and f2, used to a BS and a RS, respectively, is illustrated. Moreover, the system implements a four (4) slot interlacing, in which three (3) slots (1 for main channel and 2 for assistant channels) are used for transmission for an encoder packet, and a two-hop transmission scheme. Further, the first frequency, f1, is used by the BS, and the second frequency, f2, is used by the RS.

In this figure and throughout the document, packet and subpacket can be used interchangeably. In addition, a mobile station can also be referred to as a terminal, mobile terminal, access terminal, mobile subscriber station, and a like. Moreover, a base station can also be referred to as a node, access node, base terminal station, and a like.

From the BS, an original signal, $A_{00}$, is broadcasted in packets to the MS and the RS during a first slot on f1. The first slot refers to a first time slot out of four slots followed by subsequent time slots during which additional packets can be transmitted. In second and third time slots, the BS can transmit redundant signals, $A_{01}$ and $A_{02}$, respectively, to the MS and to the RS on f1. The redundant signals are the original signal retransmitted during subsequent time slots. Here, the redundant signals or packets can be a repetition of the original signal or an encoded version of the original signal.

The packets (or subpackets) transmitted on f1 are associated with the same data packet. For example, $A_{00}$, $A_{01}$, and $A_{02}$ are part of the first data packet while $B_{00}$, $B_{01}$, and $B_{02}$ are associated with another data packet.

The RS receives and decodes the BCMCS packets broadcasted from the BS. Thereafter, the RS transmits relayed signals, $A_{00}'$-$A_{02}'$, to the MS on f2. Here, the relayed signals can be a simple repetition of the originally broadcasted signal, $A_{00}$, or an encoded version of the original signal (e.g., transmitted with systematic bits but possibly different parity bits). Moreover, the redundant signals (e.g., packets $A_{01}$ and $A_{02}$) can also be decoded and transmitted to the MS as a repeat or an encoded version (e.g., packets $A_{01}'$ and $A_{02}'$). As such, the signals from the RS can be transmitted or relayed to the MS in any combination between the simple repetition and the encoded version. Similarly to above, the packets or subpackets transmitted on f2 are associated with the same data packet.

In this embodiment and other embodiments to follow, the RS serves various functions. For example, the RS can receive, decode, and/or transmit the data packets. That is, in transmitting the data packets, the RS can "amplify and forward" which relates to simple repetition and/or "decode and forward" which relates to space-time encoding, for example. In addition, the RS requires a certain minimum amount of time to decode the received packet before it can be transmitted (relayed) to the MS. As such, the timing of the relayed transmissions from the RS can be altered.

Furthermore, the RS can be equipped with multiple antennas to achieve transmit diversity. At the same time, the BS and the MS can also be equipped with multiple antennas to achieve diversity. A multi-input, multi-output (MIMO) can provide transmit diversity to increase efficiency of wireless resources. The use of multiple antennas provides the RS and other terminals (e.g., mobile station and base station) to achieve diversity gain without increase in broadband. For example space-time code (STC) can be used to increase reliability of communication links, spatial multiplexing (SM) can be used to increase transmission capacity, or a full diversity full rate space time code (FDFR-STC) can be used to achieve full diversity.

Referring to FIG. 18, the BS broadcasts packet $A_{00}$ during the first time slot, followed by packet $A_{01}$ during the second time slot on f1 to the MS and the RS. During the third time slot, the BS transmits packet $A_{02}$ to the MS and the RS on f1 while the RS transmits packet $A_{00}'$, which is either a repetition of packet $A_{00}$ or an encoded version of packet $A_{00}$, to the MS on f2. During the fourth time slot, the BS does not broadcasts any packets while the RS transmits packet $A_{01}'$, which is either a repetition of packet $A_{01}$ or an encoded version of packet $A_{01}$, to the MS on f2. The similar process is repeated in intervals of four slots until the MS receives the packets transmitted from the BS.

The MS receives the packets transmitted from the BS and the RS and decodes. If the MS successfully decodes the packets using a part of all received packets, the MS does not have to decode the remaining packets. For example, if the MS successfully decodes the message based on packets $A_{00}$ and $A_{01}$, the remaining packets $A_{02}$ and $A_{01}'$-$A_{02}'$ need not be decoded.

Figure 19:
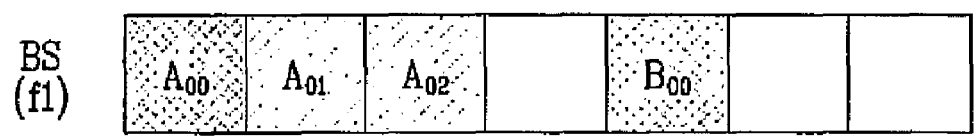
FIG. 19 illustrates a scheme for a relayed BCMCS according to another embodiment of the present invention.
Figure 19:
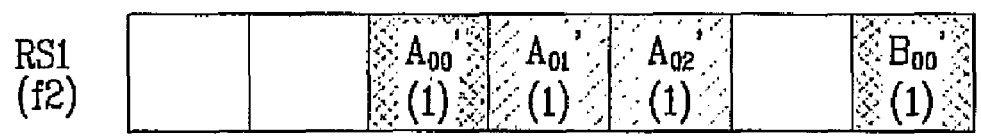
Figure 19:
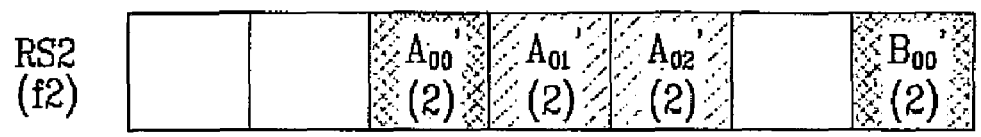
Figure 19:
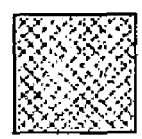
Figure 19:
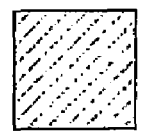

FIG. 19 illustrates a scheme for a relayed BCMCS according to another embodiment of the present invention. In FIG. 19, a multi-hop, multi-carrier system having two frequency carriers, represented by f1 and f2, used by a BS and two (2) RSs (i.e., RS1 and RS2) is illustrated. As same as FIG. 18, the system implements a four (4) slot interlacing, in which three (3) slots (1 for main channel and 2 for assistant channels) are used for transmission for an encoder packet, and a two-hop transmission scheme. The first frequency, f1, is used by the BS, and the second frequency, f2, is used by RS1 and RS2.

From the BS, an original signal, $A_{00}$, is broadcasted in packets to the MS and to RS1 and RS2 during the first slot. The first slot refers to a first time slot for broadcasting the original packet which is then followed by subsequent time slots during which additional packets can be transmitted. In a second and third time slots, the BS transmits redundant signals, $A_{01}$, and $A_{02}$, respectively, to the MS and the RS on f1. The redundant signals are the original signal retransmitted during subsequent time slots. Here, the redundant signals or packets can be a repetition of the original signal or an encoded version of the original signal.

The RSs receive and decode the BCMCS packets broadcasted from the BS. Thereafter, RS1 and RS2 respectively transmit relayed signals, $A_{00}'(1)$-$A_{02}'(1)$ and $A_{00}'(2)$-$A_{02}'(2)$ to the MS on f2. Here, the relayed signals can be a simple repetition of the originally broadcasted signal (e.g., packets $A_{00}$ and $B_{00}$) or an encoded version of the original signal (e.g., transmitted with systematic bits but possibly different parity bits). Moreover, the redundant signals can also be decoded and transmitted to the MS as a repeat or an encoded version. As such, the signals from the RSs can be transmitted or relayed to the MS in any combination between the simple repetition and the encoded version.

In practice, the transmissions from RS1 and RS2 to the MS can be made in any combination. That is, RS1 can transmit either the repeated packet or the encoded packet to the MS while RS2 transmits either the repeated packet or the encoded packet during the same time slots. For example, since $A_{00}'(1)$ and $A_{00}'(2)$ are both modified signals of the original signal $A_{00}$, RS1 can transmit a space-time coded packet $A_{00}'(1)$ and RS2 can transmit a repeated packet $A_{00}'(2)$ to the MS during the same time slot on f2. Moreover, in the subsequent time slot RS1 can transmit a repeated packet $A_{01}'(1)$ and RS2 can transmit a space-time coded packet $A_{01}'(2)$ on f2 to the MS. Further, subsequent transmissions to the MS from RS1 and RS2 can be arranged.

Referring to FIG. 19, the BS broadcasts packet $A_{00}$ during the first time slot, followed by packet $A_{01}$ during the second time slot on f1 to the MS and the RSs. During the third time slot the BS transmits packet $A_{02}$ to the MS and RS1 and RS2 on f1 while RS1 and RS2 respectively transmit to the MS on f2 packet $A_{00}'(1)$ and $A_{00}'(2)$, which can be any one of a repetition of packet $A_{00}$ and an encoded version of packet $A_{00}$. During the fourth time slot, the BS does not broadcast any packets or signals while RS1 and RS2 each transmit packet $A_{01}'(1)$ and $A_{01}'(2)$, respectively, which is either a repetition of packet $A_{01}$ or an encoded version of packet $A_{01}$, to the MS on f2 The similar process is repeated in intervals of four slots until the MS receives the packets transmitted from the BS.

As mentioned above, after the MS receives the packets transmitted from the BS and the RS and decodes it, if the MS successfully decodes the packets using a part of all received packets, the MS does not have to decode the remaining packets. For example, if the MS successfully decodes the message based on packets $A_{00}$ and $A_{01}$, the remaining packets $A_{02}$, $A_{00}'(1)$-$A_{02}'(1)$ and $A_{00}'(2)$-$A_{02}'(2)$ need not be decoded.

Figure 20:
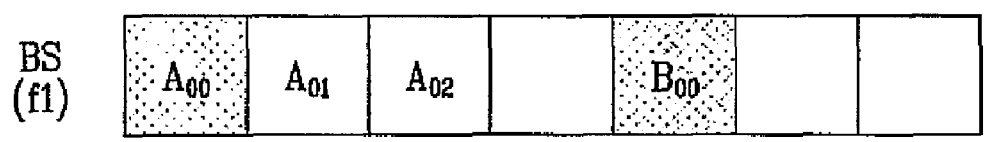
FIG. 20 illustrates a scheme for a relayed BCMCS according another embodiment of the present invention.
Figure 20:
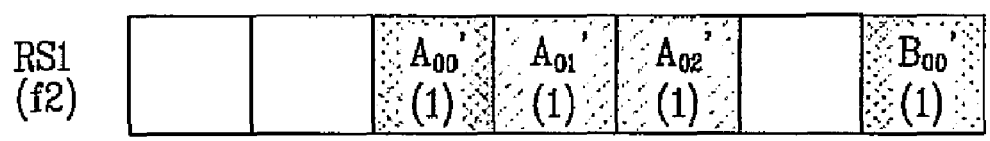
Figure 20:
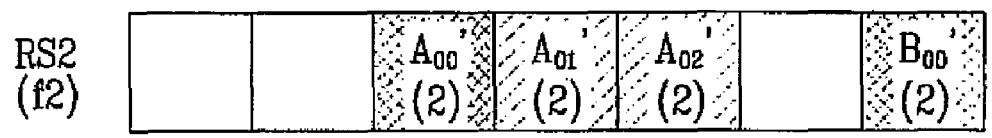
Figure 20:
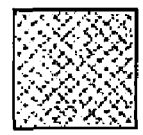
Figure 20:
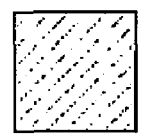
Figure 21:
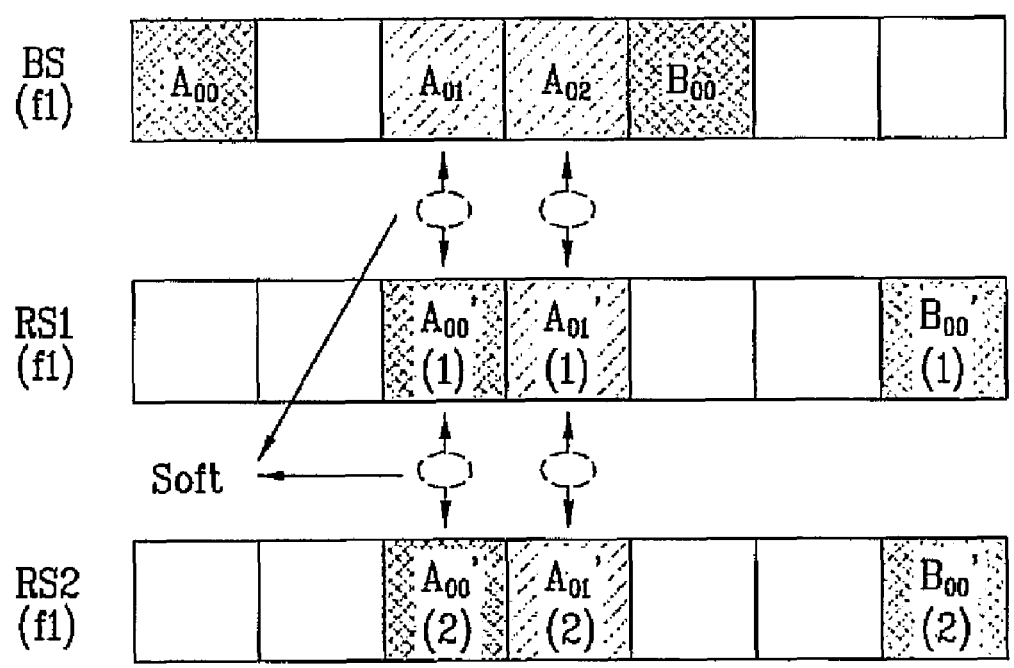
FIG. 21 illustrates a scheme for a relayed BCMCS according to another embodiment of the present invention.
Figure 21:
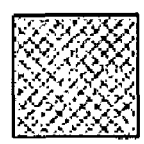
Figure 21:
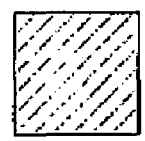

FIG. 20 illustrates a scheme for a relayed BCMCS according another embodiment of the present invention. In FIG. 21, a single frequency carrier having a time-division multiplexing (TDM) is applied in a multi-hop system. In this system, a time division multiplexing (TDM) operation with a single frequency carrier (e.g., f1) is used. Similarly to previous figures, the system implements a four (4) slot interlacing, in which three (3) slots (1 for main channel and 2 for assistant channels) are used for transmission for an encoder packet, and a two-hop transmission scheme.

Since the BS and the MS share the same spectrum in a TDM fashion, the transmission time for a single packet is doubled. As described above, the BS broadcasts the original signal (i.e., packet $A_{00}$) during the first transmission time slot on f1. The RS then receives and decodes the BS') transmission of packet $A_{00}$. Thereafter, the RS transmits a 'relayed signal or relayed packet' $A_{00}'$ during the third transmission time slot on the main channel. At same time, the BS transmits a redundant signal $A_{01}$ to the MS on the assistant channel. Here, the packets transmitted during the third time slot, namely, $A_{01}$ and $A_{00}'$ can be any one of simple repetition of packet $A_{00}$ and space-time coded version of packet $A_{00}$. Further, the packets $A_{01}$ and $A_{00}'$ can be soft combined.

Similarly, during the fourth time slot on f1, a redundant packet $A_{02}$ is transmitted by the BS on the assistant channel, and the relayed packet $A_{01}'$ is transmitted by the RS on the assistant channel. Here, the packets can be any one of simple repetition, space-time coded, and different parity bit packet of the original packet. In other words, there are a number of options for designing the relayed signal $A_{01}'$ and the BS retransmitted signal $A_{02}$. Again, the packets $A_{02}$ and $A_{01}'$ can be soft combined.

FIG. 21 illustrates a scheme for a relayed BCMCS according to another embodiment of the present invention. In FIG. 21, a single frequency carrier (i.e., f1) is used in a multi-hop system. As same as previous figures, the system implements a four (4) slot interlacing, in which three (3) slots (1 for main channel and 2 for assistant channels) are used for transmission for an encoder packet, and a two-hop transmission scheme.

In operation, the BS broadcasts packet $A_{00}$ during a first transmission time slot to the MS and two RSs (i.e., RS1 and RS2). RS1 and RS2 receive the broadcasted packet $A_{00}$ and decodes it. The decoded packet $A_{00}$ is then transformed into packets $A_{00}'(1)$-$A_{01}'(1)$ and $A_{00}'(2)$-$A_{01}'(2)'$. As described above with respect to FIG. 20, the transmission packets from the RSs can be transmitted in combination of any types. That is, the packets can be transmitted in form of simple repetition, space-time coded, or combination thereof. For example, packet $A_{01}'(1)$ of RS1 can be simple repetition of the original signal or packet $A_{00}$ while packet $A_{00}'(2)$ of RS2 can be space-time encoded version of packet $A_{00}$.

As illustrated in FIG. 21, after skipping a time slot, the BS broadcasts packet $A_{01}$ and packet $A_{02}$ on assistant channels of f1 during subsequent time slots. At the same time, RS1 and RS2 transmit relayed packets $A_{00}'(1)$ and $A_{00}'(2)$ to the MS on the main channels of f1. Here, the redundant packet $A_{01}$ and the relayed packets $A_{00}'(1)$ and $A_{00}'(2)$ can be soft combined. In the subsequent time slot, the BS broadcasts packet $A_{02}$ on assistant channels of f1 while RS1 and RS2 transmits relayed packets $A_{01}'(1)$ and $A_{01}'(2)$ to the MS on f1. Here, the redundant packet $A_{02}$ and the relayed packets $A_{01}'(1)$ and $A_{01}'(2)$ can be soft combined.

As discussed above, the redundant packets broadcasted from the BS and the relayed packets transmitted from RS1 and RS2 can be in form of repetition or space-time encoded. Moreover, the relayed packets can also have different parity bits.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting data packets in a mobile communication system using at least one relay station (RS) and a single frequency carrier, the method comprising:

transmitting two or more subpackets of a first data packet to a mobile station (MS) via a first set of four consecutive time slots; and transmitting two or more subpackets of a second data packet to the MS using the at least one RS via a first set of four consecutive time slots, wherein a first subpacket of the first data packet is transmitted via a main channel in the first set of four consecutive time slots and a first subpacket of the second data packet is transmitted via a main channel in the second set of four consecutive time slots, wherein at least one subsequent subpacket of the first data packet is transmitted via at least one assistant channel in the first set of four consecutive time slots and at least one subsequent subpacket of the second data packet is transmitted via at least one assistant channel in the second set of four consecutive time slots, wherein the first data packet and the second data packet comprise the same information, wherein a first subsequent subpacket of the at least one subsequent subpacket of the first data packet is synchronously transmitted with the first subpacket of the second data packet, wherein at least one subpacket subsequent to the first subsequent subpacket of the first data packet is synchronously transmitted with at least one subpacket of the second data packet, wherein if at least two relay stations (RSs) are used, each of the at least two RSs synchronously transmit the first subpacket of the second data packet via the main channel and the at least one subsequent subpacket of the second data packet via the at least one assistant channel, wherein the first subpacket of the second data packet transmitted using a second RS is a space-time coded version of the first subpacket of the second data packet transmitted using a first RS, and wherein the at least one subsequent subpacket of the second data packet transmitted using the second RS is a space-time coded version of the at least one subsequent subpacket of the second data packet transmitted using the first RS.

2. The method of claim 1, wherein the first data packet and the second data packet are broadcast packets for a broadcast multicast service (BCMCS) system.

3. The method of claim 1, wherein the at least one subsequent subpacket of the second data packet comprises different parity bits than parity bits of the first subpacket of the second data packet.

4. The method of claim 1, wherein the at least one subsequent subpacket of the second data packet is transmitted using an amplified signal strength relative to a signal strength used to transmit the at least one subsequent subpacket of the first data packet.

5. The method of claim 1, wherein the at least one subsequent subpacket of the first data packet is transmitted using an amplified signal strength relative to a signal strength used to transmit the first subpacket of the first data packet.

6. The method of claim 1, wherein at least one subpacket of the second data packet transmitted using the RS is transmitted at least one time slot after the transmission of at least one subpacket of the first data packet by a base station.

* * * * *